(12) United States Patent
Uchiyama et al.

(10) Patent No.: US 7,310,163 B2
(45) Date of Patent: Dec. 18, 2007

(54) INFORMATION INPUT/OUTPUT SYSTEM, METHOD AND TERMINAL THEREFOR

(75) Inventors: Hiroki Uchiyama, Yokohama (JP); Takahiro Asai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 109 days.

(21) Appl. No.: 11/242,529

(22) Filed: Oct. 4, 2005

(65) Prior Publication Data

US 2006/0028680 A1 Feb. 9, 2006

Related U.S. Application Data

(62) Division of application No. 09/942,592, filed on Aug. 31, 2001, now Pat. No. 7,199,893.

(30) Foreign Application Priority Data

Aug. 31, 2000 (JP) ............................ P2000-264123

(51) Int. Cl.
*H04N 1/00* (2006.01)
(52) U.S. Cl. .................... 358/1.15; 358/407; 358/1.18
(58) Field of Classification Search ............... 358/1.15, 358/407, 1.18, 1.12; 399/6
See application file for complete search history.

(56) References Cited

U.S. PATENT DOCUMENTS 4,910,765 A 3/1990 Matsuse et al.

(Continued)

FOREIGN PATENT DOCUMENTS

EP 0 930 757 7/1999

(Continued)

OTHER PUBLICATIONS

U.S. Appl. No. 11/242,529, filed Oct. 4, 2005, Uchiyama et al.

(Continued)

*Primary Examiner*—Thomas D. Lee
(74) *Attorney, Agent, or Firm*—Oblon, Spivak, McClelland, Maier & Neustadt, P.C.

(57) ABSTRACT

An information input/output system includes printer servers and facsimile servers, connected with the Internet respectively, and printers and facsimile apparatuses connected with the printer and facsimile servers, respectively. A terminal is configured to access information contents on the Internet and to transmit printing request data including at least a contents ID specifying information contents for printing from among the information contents on the Internet and a print outputting destination ID specifying one of the printers or facsimile apparatuses for printing therewith the information contents for printing. A printing request administration server is configured to receive the printing request data transmitted from the terminal and to transmit the printing request data to one of the facsimile or printer servers determined according to the print outputting destination ID. Each of the printer or facsimile servers stores information as to the printers and the facsimile apparatuses, and outputs the information contents for printing to the one of the printer or facsimile servers determined according to the print outputting destination ID, after converting the information contents for printing, according to the information corresponding to the one of the printers or facsimile apparatuses specified by the print outputting destination ID, such that the information contents for printing can be printed by the one of the printers or facsimile apparatuses specified by the print outputting destination ID.

4 Claims, 18 Drawing Sheets

U.S. PATENT DOCUMENTS

| | | | |
|---|---|---|---|
| 5,506,661 A * | 4/1996 | Hanzawa | 399/1 |
| 5,933,584 A * | 8/1999 | Maniwa | 358/1.15 |
| 6,130,757 A * | 10/2000 | Yoshida et al. | 358/1.15 |
| 6,362,894 B1 | 3/2002 | Shima | |
| 6,434,572 B2 * | 8/2002 | Derzay et al. | 707/104.1 |
| 6,631,008 B2 | 10/2003 | Aoki | |
| 6,778,289 B1 * | 8/2004 | Iwata | 358/1.15 |
| 6,891,636 B1 * | 5/2005 | Kawai et al. | 358/1.18 |
| 7,028,102 B1 * | 4/2006 | Larsson et al. | 709/246 |
| 2001/0029531 A1 * | 10/2001 | Ohta | 709/223 |
| 2001/0034774 A1 | 10/2001 | Watanabe et al. | |
| 2006/0028680 A1 | 2/2006 | Uchiyama et al. | |

FOREIGN PATENT DOCUMENTS

| | | |
|---|---|---|
| EP | 0 961 451 | 12/1999 |
| EP | 1 022 894 | 7/2000 |
| JP | 2000-25306 | 1/2000 |
| JP | 2000-197116 | 7/2000 |
| JP | 3598791 | 9/2004 |
| JP | 3772504 | 2/2006 |
| JP | 3780099 | 3/2006 |
| WO | WO 00/68817 | 11/2000 |

OTHER PUBLICATIONS

U.S. Appl. No. 11/242,528, filed Oct. 4, 2005, Uchiyama et al.
U.S. Appl. No. 11/514,896, filed Sep. 5, 2006, Nagahara et al.

* cited by examiner

EXAMPLE OF INITIAL SELECTION SCREEN

EXAMPLE OF PRINTING CONTENTS
SELECTION SCREEN

EXAMPLE OF CONTNETS SELECTION SCREEN

EXAMPLE OF CONTENTS PRINTING REQUEST CONFIRMATION SCREEN

EXAMPLE OF URL INPUTTING METHOD SELECTION SCREEN

EXAMPLE OF THE SCREEN FOR DIRECTLY INPUTTING URL

EXAMPLE OF URL SELECTION SCREEN

EXAMPLE OF OUTPUTTING DESTINATION
DEVICE SELECTION SCREEN

FIG. 16

WHEN DO YOU WISH TO PRINT ?

● IMMEDIATELY
○ AT DESIGNATED TIME
○ AFTER SPECIFIED TIME

OK  CANCEL

0. RETURN

EXAMPLE OF PRINTING TIME DESIGNATION METHOD SELECTION SCREEN

FIG. 17

DESIGNATE PRINTING DAY AND TIME

☐ MONTH  ☐ DAY

☐ : ☐

OK  CANCEL

0. RETURN

EXAMPLE OF PRINTING TIME DESIGNATION SCREEN

FIG. 18

DESIGNATE PRINTING TIME

☐ HOURS

☐ MINUTES LATER

OK  CANCEL

0. RETURN

EXAMPLE OF PRINTING TIME DESIGNATION SCREEN ( AFTER SPECIFIED TIME )

EXAMPLE OF FACSIMILE NUMBER INPUTTING METHOD SELECTION SCREEN

EXAMPLE OF FACSIMILE NUMBER DIRECT INPUTTING SCREEN

EXAMPLE OF FACSIMILE NUMBER SELECTION SCREEN

TERMINAL SCREEN  PRINTED IMAGE

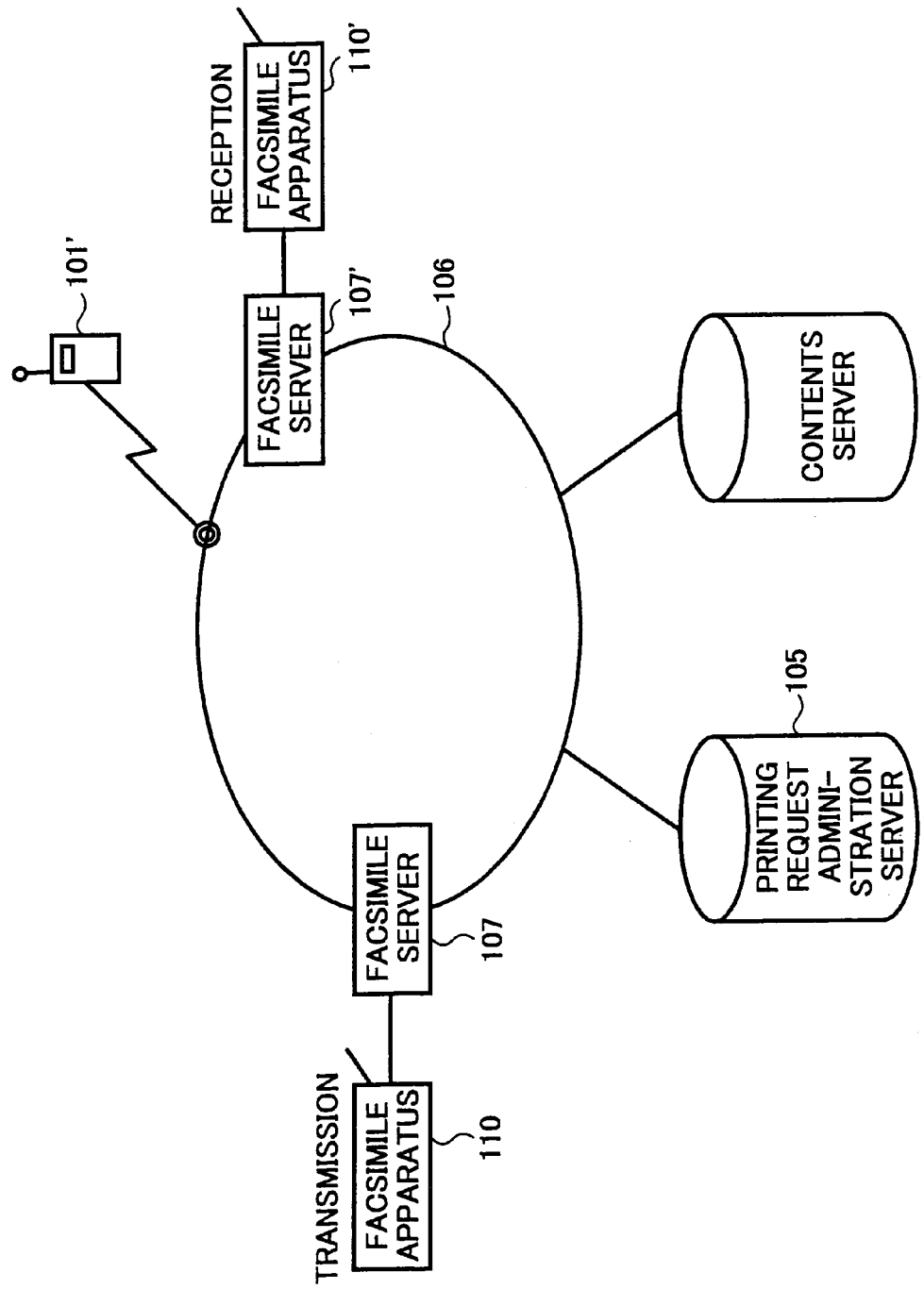

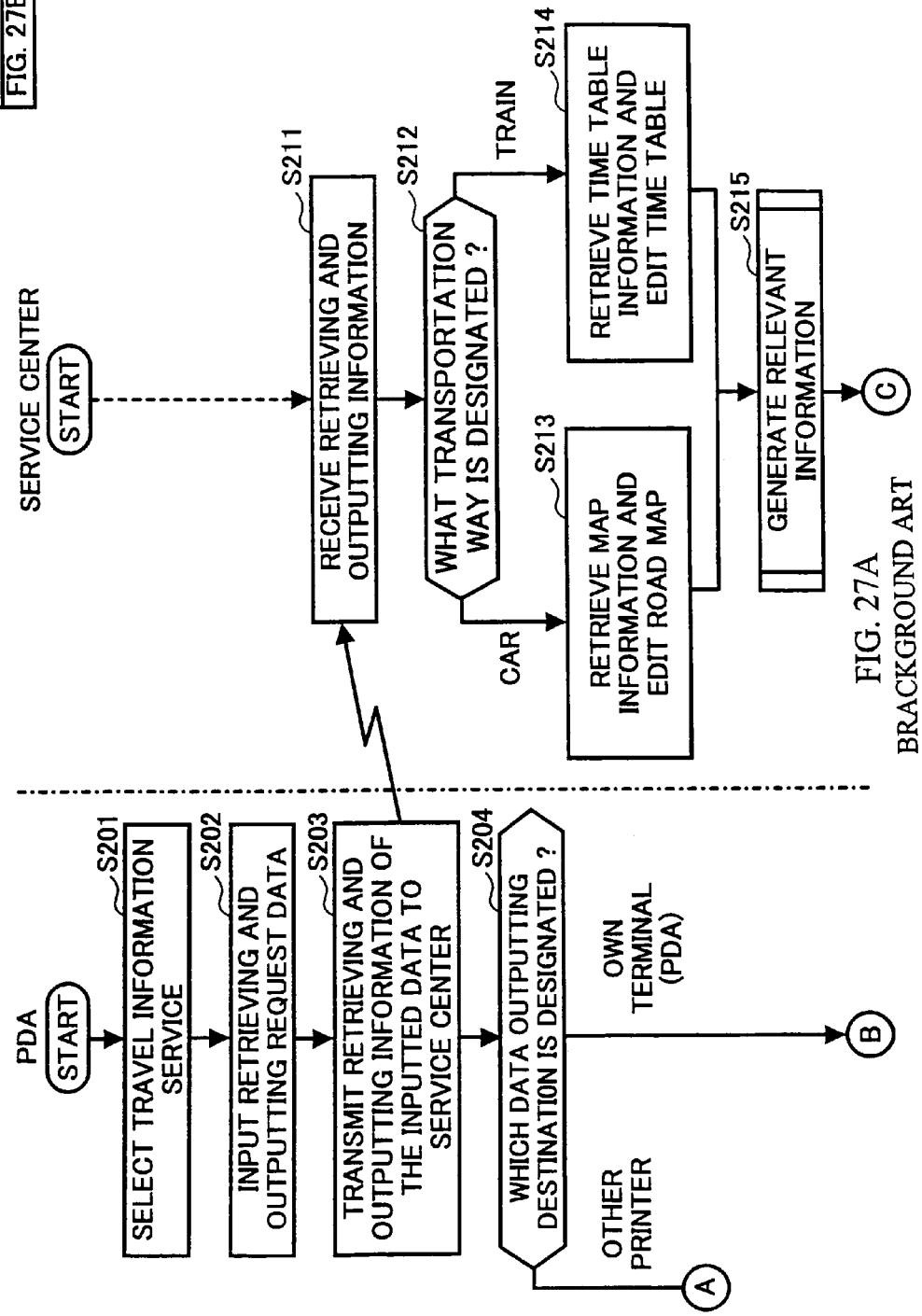
FIG. 27A BRACKGROUND ART

INFORMATION INPUT/OUTPUT SYSTEM, METHOD AND TERMINAL THEREFOR

CROSS-REFERENCES TO RELATED APPLICATIONS

This application is a divisional of and claims the benefit of priority from pending U.S. patent application Ser. No. 09/942,592 filed on Aug. 31, 2001, now U.S. Pat. No. 7,199,893 which claims the benefit of priority from Japanese Patent Application No. 2000-264123, filed on Aug. 31, 2000, the entire contents of all of which are incorporated herein by reference.

BACKGROUND OF THE INVENTION

1. Field of the Invention

The present invention relates to an information input/output system which enables outputting of desired information contents in a host computer with a desired outputting device, such as a printer and a facsimile apparatus, using a terminal such as a cellular phone, a Portable Digital Assistant (PDA), etc. The present invention also relates to a terminal for the system.

2. Discussion of the Background

Recently, with the popularization of portable information terminals such as notebook personal computers and PDAs, and portable communication terminals such as Personal Handy-phone Systems (PDSs) and cellular phones, it has become possible to easily perform document creation and communication, such as electronic mailing, independently of the place where the user is located using such a portable information or communication terminal. Further, using a communication function provided in such a terminal, the user can be provided with various services from a service provider via a network (communication line), such as banking services (e.g., balance checking, money transfer, etc.), and reservation of a ticket (e.g., airline ticket, etc.).

However, portable terminals are not generally provided with a printer to print out a created document or information obtained via various services. Therefore, it is not so easy for a user to print out a created document or obtained information while the user is moving from one place to another. Accordingly, an information input/output system has been proposed in which the user of a portable information terminal can print out desired information with a printer at a designated place.

For example, FIG. 27A and FIG. 27B are flowcharts illustrating an information outputting process of an information input/output system disclosed in Japanese Patent Laid-open publication No. 10-222527. The flowcharts illustrate a process performed between a PDA and a service center providing a service of printing out desired information at a designated place. FIGS. 27A and 27B illustrate a case wherein a travel information service is provided.

First, a user of the PDA selects a travel information service from among various services by an inputting operation of the PDA (step S201). The user then inputs from the PDA retrieving and outputting request data specifying traveling information of the user, such as the starting place, the destination, the transportation way, a data outputting destination, etc. (step S202). The system then transmits retrieving and outputting request information of the inputted retrieving and outputting request data to the service center (step S203).

The service center receives the above retrieving and outputting request information (step S211), and first confirms the transportation way (step S212). For example, when the transportation way is specified as a car (step S212, car), the service center retrieves map information from an existing database based upon information of the starting place and destination received at the same time, and edits a road map (step S213). When the transportation way is specified as a train (step S212, train), the service center retrieves time table information from an existing database based upon the information of the starting place and destination, and edits a train time table from the starting place to the destination (step S214).

The service center then generates information relevant to the information generated in steps S213 and S214 (step S215). For example, information relating to sightseeing in the vicinity of the destination and weather information are generated. Then, the outputting destination (a printer, a display screen of a PDA, etc.) for outputting the generated information is determined (step S216) according to the data outputting destination designated by the user in step S204.

For example, when a display screen of a PDA is designated by the user (step S204, own terminal; step S216, PDA), the service center transmits the generated information to the PDA (step S217), and the PDA outputs the information in the display screen of the PDA (step S205).

When a printer is designated by the user (step S204, other printer, step S216, other printer), the service center retrieves various facilities such as convenience stores, gas stations, toll stations of highways, etc., generates an outputting destination candidates list, and transmits the list to the PDA (step S218). The PDA then displays the list in the display screen of the PDA (step S206). The user selects an outputting destination from among the candidates in the list, and transmits outputting destination designation information to the service center (step S207). The service center receives the outputting destination designation information (step S219), and transmits the information which has been generated in advance, such as map or timetable information, to the designated outputting destination, and controls a printer at the designated outputting destination to print out the information (step S220).

Thus, in the above-described information input/output system, even when a user of a portable information terminal (e.g., a PDA) travels from one place to another, the user can selectively change the outputting destination as the user changes the traveling destination according to the services provided from the service center, so that desired information can be easily printed by a printer at a designated outputting destination.

However, some outputting apparatuses (e.g., printers) in the currently available information input/output systems can only print information onto a sheet of a specific size, e.g., an A4 size sheet, or can only output information of a specific file. When an outputting request is made to an outputting apparatus specifying a sheet size or a file that cannot be outputted with the outputting apparatus, an operational or outputting error is caused in the outputting apparatus.

In information services provided to portable information terminals that can be connected with the Internet, desired information contents are generally obtained via a menu of multi-level layers. Information contents on the Internet are generally diverse and the number of information contents is huge. When desired information contents are difficult for a user to read on a display screen of a terminal, which is typically relatively small, the user generally wishes to print out the contents. In this case, the user may wish to print information contents selected on the display screen of the terminal. However, a system has not been available which allows the user to input a printing request after displaying desired information contents on a display screen of a terminal or after selecting desired information contents in a menu being displayed on the display screen of the terminal.

Generally, for inputting a printing request, after displaying desired information contents on a display screen of a terminal or after selecting desired information contents in a menu being displayed on the display screen, another menu having a printing instruction must be opened, or a printing button must be provided at a part of the information contents being displayed on the display screen. In this case, addition of another menu or change of the information contents is necessary. However, when the number of information contents is huge, change of each information contents is troublesome and time consuming. When another menu having a printing instruction is provided at the bottom part of a menu, when menu items are many, a long scrolling operation is necessary to reach the printing instruction in the menu, which is troublesome.

Further, some information terminals display an address of information contents. In this case, when a menu of multi-level layers is used, the address is relatively long, and therefore some users wish the address not to be displayed.

Furthermore, image information has been strongly desired to be provided to portable terminals connected with the Internet. However, generally, information can be received by a portable terminal as long as the information can be displayed in a display screen of the terminal. Typically, portable terminals can receive image data of a relatively small size or text data of up to about 256 characters. When information is of relatively large size and cannot be displayed in the display screen of the terminal, a part of the information is deleted, so that the received information is not accurate. A method may be conceivable to attach a dedicated printer to each portable terminal, so that image information can be outputted with the attached printer while being received by the terminal. However, such a printer is relatively expensive, large, and heavy, and is not well suited to be carried.

Furthermore, when information contents are obtained and outputted with an outputting apparatus using a terminal via a network, an appropriate billing system for billing the user of the terminal for the obtained information contents is required. A copying machine installed, for example, at a convenience store is generally provided with a fee collecting device, so that each time prints are made with the copying machine, the fee for the prints is paid. Furthermore, recently, a system for remotely diagnosing copying machines in the field has been proposed, and some copying machines in convenience stores are provided with the function of being remotely diagnosed by the system. The fee collecting device provided to the copying machines installed at convenience stores generally uses a billing system in which the fee for prints changes according to the number of prints. Typically, the fee per print decreases as the number of prints increases. Therefore, when fee-charging information contents obtained using a portable terminal are printed with a copying machine provided with a fee collecting device having such a billing system, and the outputting fee collected by the fee collecting device is to be distributed between the provider of the fee-charging information contents and the provider of the copying machine, appropriate distribution of the outputting fee is troublesome.

In a method of accessing information contents and outputting the information contents with a facsimile machine using a cellular phone, which has been previously proposed by the present applicant, when outputting the contents, a user must access a printing request administration server for designating a print outputting facsimile apparatus. In the above-described method of outputting information contents with a facsimile apparatus, the user generally operates his or her cellular phone to access desired information contents in front of the facsimile apparatus installed, for example, in a convenience store, with which the user desires to output the desired information contents. The user then accesses the printing request administration server, and designates the facsimile apparatus in front of the user for the print outputting destination device, so that the desired information contents are printed by the facsimile apparatus.

However, when the facsimile apparatus is installed in a building where radio communication is not possible, to access the desired information contents with the cellular phone, the user must move to a place where the radio communication is possible. Therefore, so that the user can designate the facsimile apparatus in front of the user for the print outputting destination device, the user must record the facsimile number of the facsimile apparatus before moving to the place where the radio communication is possible, which is troublesome.

SUMMARY OF THE INVENTION

The present invention has been made in view of the above-discussed and other problems and addresses the above-discussed and other problems.

A preferred embodiment of the present invention provides a novel information input/output system that enables a user to output desired information contents without worrying about the capability and performance of an outputting apparatus.

Another preferred embodiment of the present invention provides a novel information input/output system in which selected information contents can be easily printed, and a terminal device for the system.

Another preferred embodiment of the present invention provides a novel information input/output system that enables information that cannot be received by a portable terminal of a user to be outputted by an outputting apparatus the user designates.

Another preferred embodiment of the present invention provides a novel information input/output system that enables billing a user easily and appropriately when the user has obtained fee-charging information contents.

Another preferred embodiment of the present invention provides a novel information input/output system in which information contents can be obtained with a cellular phone even when a user of the cellular phone is located in a place where radio communication is not possible.

According to a preferred embodiment of the present invention, an information input/output system includes printer servers connected with the Internet and configured to access information contents on the Internet, respectively, facsimile servers connected with the Internet and configured to access the information contents on the Internet, respectively, printers connected with the printer servers, respectively, and facsimile apparatuses connected with the facsimile servers, respectively. A terminal is configured to be connected with the Internet to access information contents on the Internet, and to transmit printing request data including at least a contents ID specifying information contents for printing from among the information contents on the Internet and a print outputting destination ID specifying one of the printers or facsimile apparatuses for printing therewith the specified information contents for printing. Further, a printing request administration server is connected with the Internet and is configured to receive the printing request data transmitted from the terminal and to transmit the printing request data to one of the facsimile servers or printer servers determined according to the print outputting destination ID. Each of the printer servers and the facsimile servers stores information as to the printers and the facsimile apparatuses connected with the printer servers and the facsimile servers, respectively, and outputs the specified information contents for printing to the one of the printers or facsimile apparatuses specified by the print outputting destination ID, after converting the specified information contents for printing, according to the information corresponding to the one of the printers or facsimile apparatuses specified by the print outputting destination ID, such that the specified information contents for printing can be printed by the one of the printers or facsimile apparatuses specified by the print outputting destination ID.

According to another preferred embodiment of the present invention, in the above information input/output system, the terminal is further configured to display the accessed information contents on a display screen of the terminal. The terminal is provided with a printing button configured to input, when depressed, an instruction to transmit the printing request data including at least the contents ID and the print outputting destination ID to the printing request administration server. The printing button is separate from an operation button, which is displayed on the display screen of the terminal within the information contents being displayed on the display screen and which links, when selected, the printing request data to the printing request administration server.

The printing button may be one of a soft button, which is displayed by software at a predetermined position on the display screen of the terminal, and a mechanical push-button switch, which is arranged at a part of the terminal.

Further, the printing button may be configured such that when the printing button is depressed, a part or the whole of information stored in the terminal is transmitted to the printing request administration server.

Furthermore, the terminal may be configured such that whether to display or not to display on the display screen of the terminal a part or the whole of information which is stored in the terminal and which is to be transmitted to the printing request administration server when the printing button is depressed, is selectively determined.

According to another preferred embodiment of the present invention, the information input/output system includes a gateway configured to relay data transmission and reception between the terminal and the Internet. When the gateway relays data that cannot be received by the terminal, the gateway stores the data without transmitting the data to the terminal, and assigns the contents ID to the stored data.

The gateway may be configured to notify the terminal that the data that cannot be received by the terminal is stored.

The gateway may be further configured to notify a user of the terminal that the data that cannot be received by the terminal is stored by sending an electronic mail to an electronic mail address of the user.

According to another preferred embodiment of the present invention, an information input/output system includes printer servers connected with the Internet, facsimile servers connected with the Internet, printers connected with the printer servers, facsimile apparatuses connected with the facsimile servers, terminals configured to be connected with the Internet to access information contents on the Internet, and to transmit printing request data including at least a contents ID specifying information contents for printing from among the information contents on the Internet and a print outputting destination ID specifying one of the printers or facsimile apparatuses for printing therewith the specified information contents for printing, and a printing request administration server connected with the Internet and configured to receive the printing request data transmitted from the terminal and to transmit the printing request data to one of the printer or facsimile servers determined according to the print outputting destination ID. The printing request administration server is configured to compile and edit, for each of the terminals, information as to the specified information contents for printing and the one of the printers or facsimile apparatuses for printing therewith the specified information contents, specified respectively by the contents ID and the print outputting destination ID received from the terminal, and to notify a contents provider of the specified information contents for printing or a system administrator of the system of a result of compiling and editing the information.

In the above information input/output systems, one of the printers or facsimile apparatuses may be configured to be connected with the terminal so as to receive the printing request data including the contents ID and the print outputting destination ID transmitted from the terminal and to transmit the printing request data to the printing request administration server. When the terminal is connected with the one of the printers or facsimile apparatuses configured to be connected with the terminal, the printing request administration server receives the printing request data from the one of the printers or facsimile apparatuses with which the terminal is connected and transmits the printing request data to the one of the printer or facsimile servers determined according to the print outputting destination ID.

The above one of the printers or facsimile apparatuses with which the terminal is connected may include a fee collecting device configured to collect a fee for printing therewith the specified information contents for printing. In this case, the printing request administration server may be configured to manage information of collecting the fee with the fee collection device.

According to another preferred embodiment of the present invention, an information input/outputting system includes a printer connected with the Internet and configured to access information contents on the Internet, and a diagnosing system connected with the Internet and configured to remotely diagnose the printer subscribing to the diagnosing system and to bill a fee for subscribing to the diagnosing system. When desired information contents is obtained from among the information contents on the Internet and the obtained information contents is outputted with the printer subscribing to the diagnosing system, a fee for outputting the information contents with the printer is added to the fee for subscribing to the diagnosing system.

According to another preferred embodiment of the present invention, a terminal for an information input/output system including printing apparatuses connected with the Internet is provided. The terminal is configured to connect with the Internet to access information contents on the Internet and to transmit printing request data including at least a contents ID specifying information contents for printing from among the information contents on the Internet and a print outputting destination ID specifying one of the printing apparatuses for printing therewith the specified information contents for printing. The terminal further includes a display screen configured to display the accessed information contents thereon, and a printing button which is configured to input, when depressed, an instruction to transmit the printing request data including the contents ID and the print outputting destination ID to the printing request administration server. The printing button is separate from an operation button, which is displayed on the display screen of the terminal within the information contents being displayed on the display screen and which links, when selected, the printing request data to the printing request administration server.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 16 is a diagram illustrating an example of a screen for selecting a printing time designation method;

FIG. 17 is a diagram illustrating an example of a printing time designation screen, which is displayed when "at designated time" is selected on the printing time designation method selection screen of FIG. 16;

FIG. 18 is a diagram illustrating an example of a printing time designation screen, which is displayed when "after specified time" is selected on the printing time designation methods selection screen of FIG. 16;

FIG. 25 is a diagram illustrating an information input/output system according to another preferred embodiment of the present invention, in which contents, which cannot be received by a terminal due to the size of the contents, is inputted to an arbitrary outputting apparatus, which is connected with the Internet directly or indirectly, so as to be outputted by the outputting apparatus;

FIG. 27A and FIG. 27B are diagrams illustrating an information outputting process of a background information input/output system.

DETAILED DESCRIPTION OF THE PREFERRED EMBODIMENTS

Figure 1:
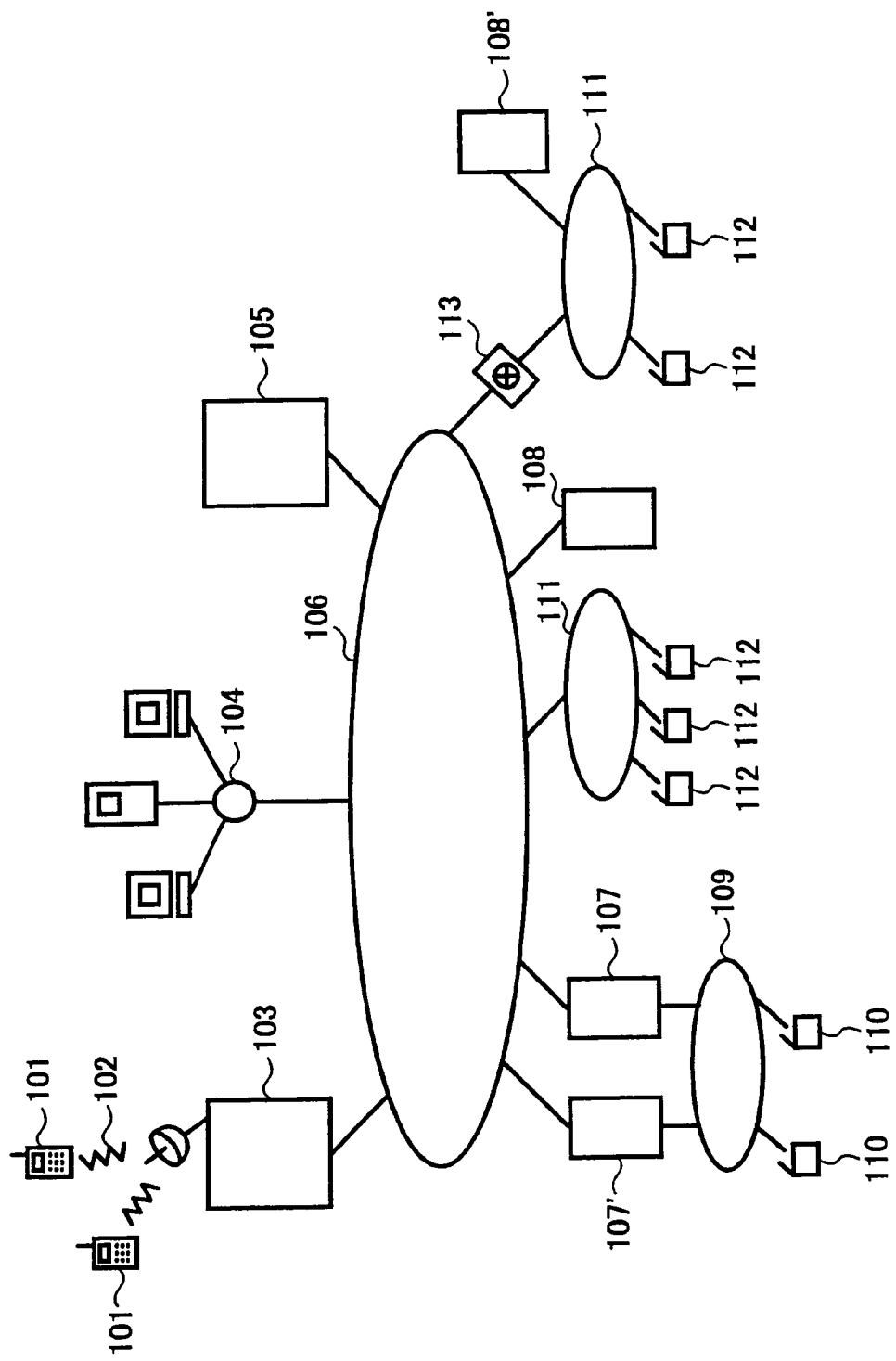
FIG. 1 is a diagram illustrating an information input/output system according to a preferred embodiment of the present invention.

Referring now to the drawings, wherein like reference numerals designate identical or corresponding parts throughout the several views, preferred embodiments of the present invention are described.

FIG. 1 is a diagram illustrating an information input/output system according to a preferred embodiment of the present invention. Numeral 101 denotes a portable communication terminal, such as a cellular phone, a PDA, etc. (hereinafter referred to a terminal 101), which functions as a commander to output a specified document with a designated outputting apparatus, such as a facsimile apparatus or a printer, through manipulation of a display screen thereof.

Numeral 102 denotes a wireless packet-switched network, numeral 103 denotes a gateway, numeral 104 denotes an Internet Service Provider (ISP), numeral 105 denotes a printing request administration server, numeral 106 denotes a network, e.g., the Internet, numerals 107 and 107' denote facsimile servers, numerals 108 and 108' denote printer servers, numeral 109 denotes a public-switched telephone network or an Integrated Services Digital Network (ISDN), numeral 110 denotes a facsimile apparatus, and numeral 113 denotes a firewall.

The facsimile apparatus 110 may be an Internet facsimile apparatus which can access the Internet. Further, in the following preferred embodiment, the description is made with respect to a case in which the terminal 101 connected with the wireless packet-switched network is used. However, the terminal 101 can be a personal computer or a workstation, connected with the ISP 104, a terminal, such as a PDA, etc. connected with a network via a modem.

In the embodiment, the terminal 101 generates print requesting data including a document ID, a print outputting destination ID, a printing time, etc., and transmits the print requesting data to the Internet, and thereby specific contents (e.g., a document) can be outputted by an appropriate outputting destination which has been obtained from the print outputting destination ID, such as a printer, a facsimile apparatus or a display, at the designated printing date and time.

Figure 2:
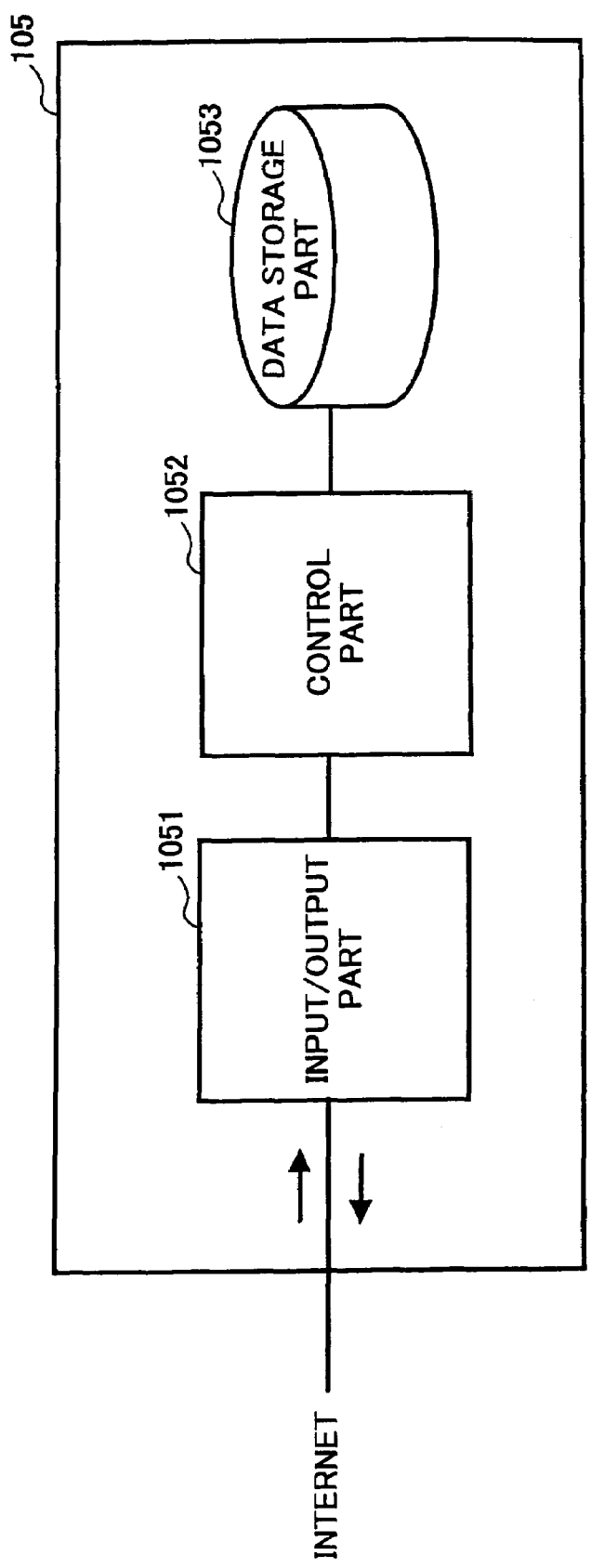
FIG. 2 is a diagram illustrating an exemplary configuration of a printing request administration server of the information input/output system.

FIG. 2 is a diagram illustrating an exemplary configuration of the printing request administration server 105. Numeral 1051 denotes an input/output part configured to input and output data or a document and control signals via the Internet, numeral 1052 denotes a control part, and numeral 1053 denotes a data storage part including a hard disk, a cache, etc. to store various data or documents.

The control part 105 performs, based upon print requesting data received from the terminal 101 via the Internet 106, management of user IDs for recognizing a user, management of the print requesting data transmitted from the terminal 101, management of the time, management of billing, displaying of the user interface, inputting of the print requesting data, determination of a print requesting data destination, transmission of the print requesting data, and reception of status and logging data. Specifically, the control part 1052 transmits the print requesting data to a printer server or a facsimile server determined according to the print outputting destination ID.

When the print outputting destination ID specifies a facsimile apparatus for the print outputting destination, from among a plurality of the facsimile servers 107, one is retrieved to be selected, which is close to the print outputting destination specified by the print outputting destination ID, for example, in reference to the area code of the facsimile number of the print outputting destination, or which has a vacant line, or which has a relatively low work load. When a printer is specified by the print outputting destination ID, one of a plurality of the printer servers 108, which is in the same or close domain, or one which has a relatively low load is retrieved to be selected.

The printer server 108' is arranged in a LAN protected by the firewall 113. Therefore, when transmitting the print requesting data to the printer server 108', the printing request administration server 105 transmits the print requesting data using a protocol (e.g., electronic mail or HTTP) that can pass through the firewall 113.

Figure 3:
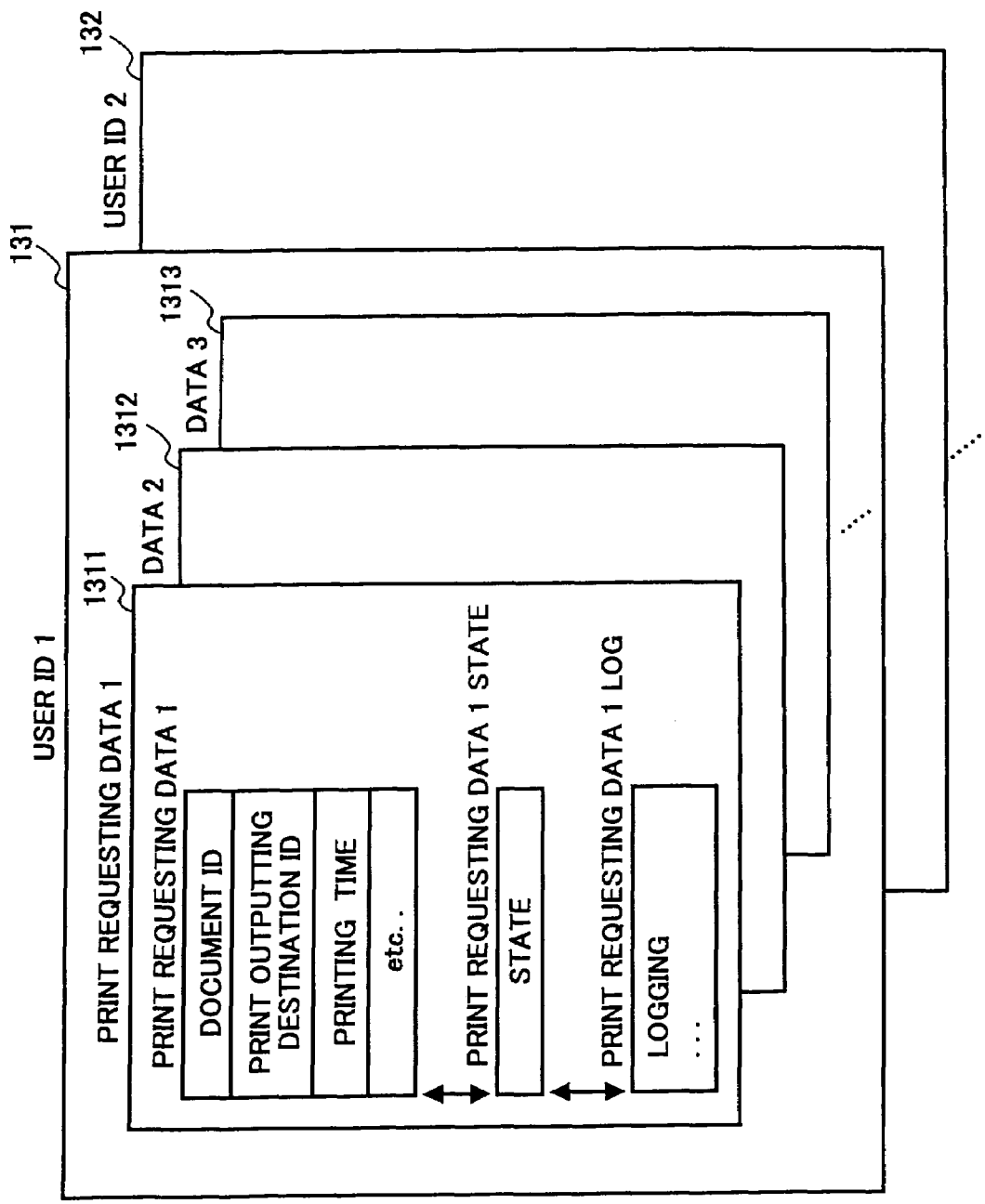
FIG. 3 is diagram illustrating an exemplary configuration of print requesting data for each user ID for the information input/output system.

FIG. 3 is diagram illustrating an exemplary configuration of the print requesting data for each user ID. As illustrated in FIG. 3, print requesting data 1 (1311) of a user ID 1 (131) includes the print requesting data including a document ID, a print outputting destination ID, a printing time, and billing information, and state data indicating whether the print requesting data is in a waiting state, whether the print requesting data has been cancelled, whether the print requesting data is being transmitted, or whether the print requesting data has been successfully or unsuccessfully transmitted, and logging data for the print requesting data.

Print requesting data 2 (1312) and data 3 (1313) of the same user of the user ID 1 have substantially the same configuration as that of the print requesting data 1 (1311). Therefore, the description thereof is omitted. Similarly, print requesting data of a user ID 2 (132) has substantially the same configuration as that of the user ID 1.

Figure 4:
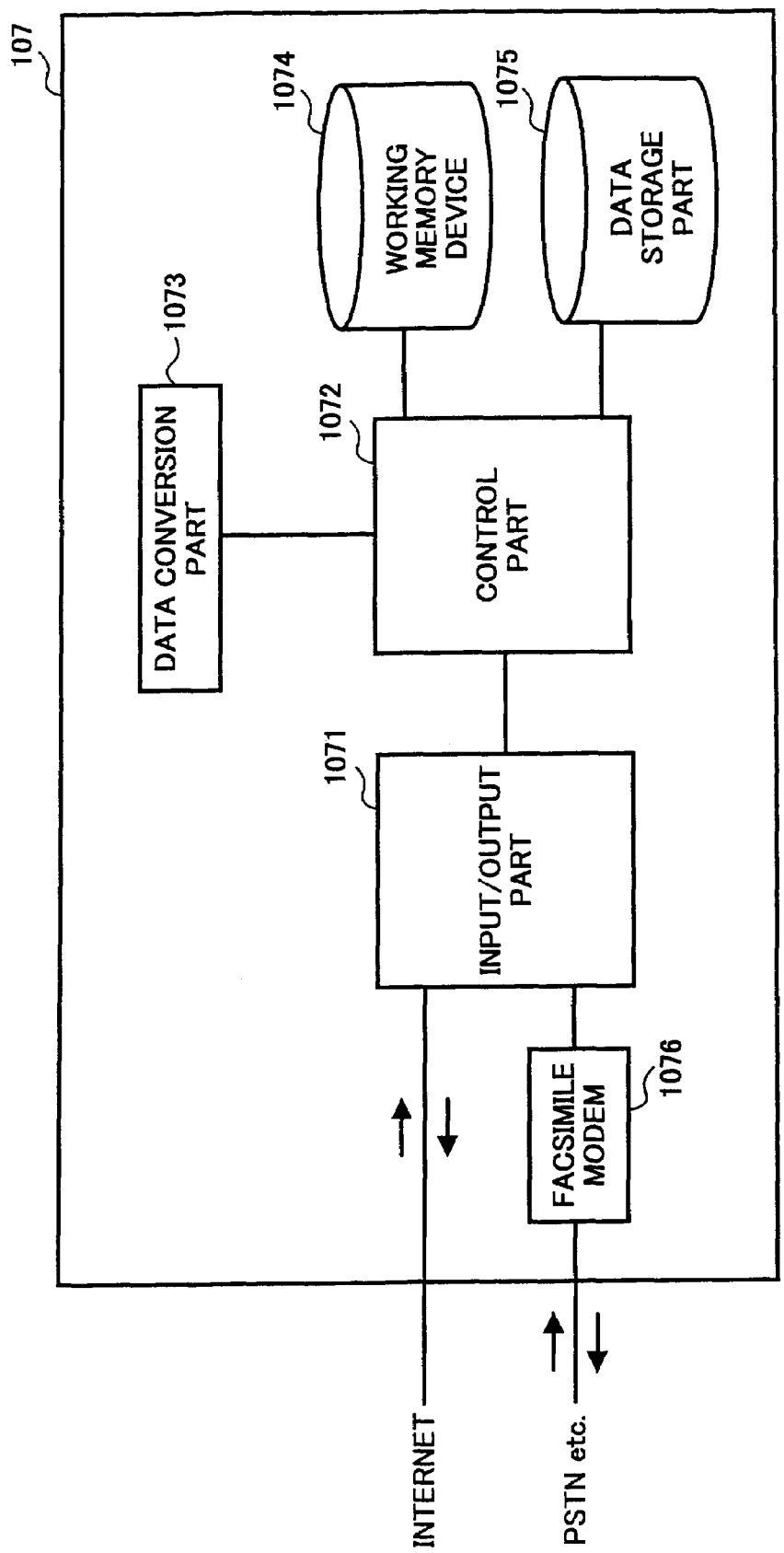
FIG. 4 illustrates an exemplary configuration of a facsimile server of the information input/output system.

FIG. 4 illustrates an exemplary configuration of the facsimile server 107 according to a preferred embodiment of the present invention. As illustrated in FIG. 4, the facsimile server 107 includes an input/output part 1071 to perform inputting from and outputting to the Internet, a control part 1072, a data conversion part 1073, a working memory device 1074 including a hard disk, a RAM, etc., a data storage part 1075 having a hard disk, a cache, etc. to store data, and a facsimile modem 1076 for inputting from and outputting to a publicly-switched network.

Figure 5:
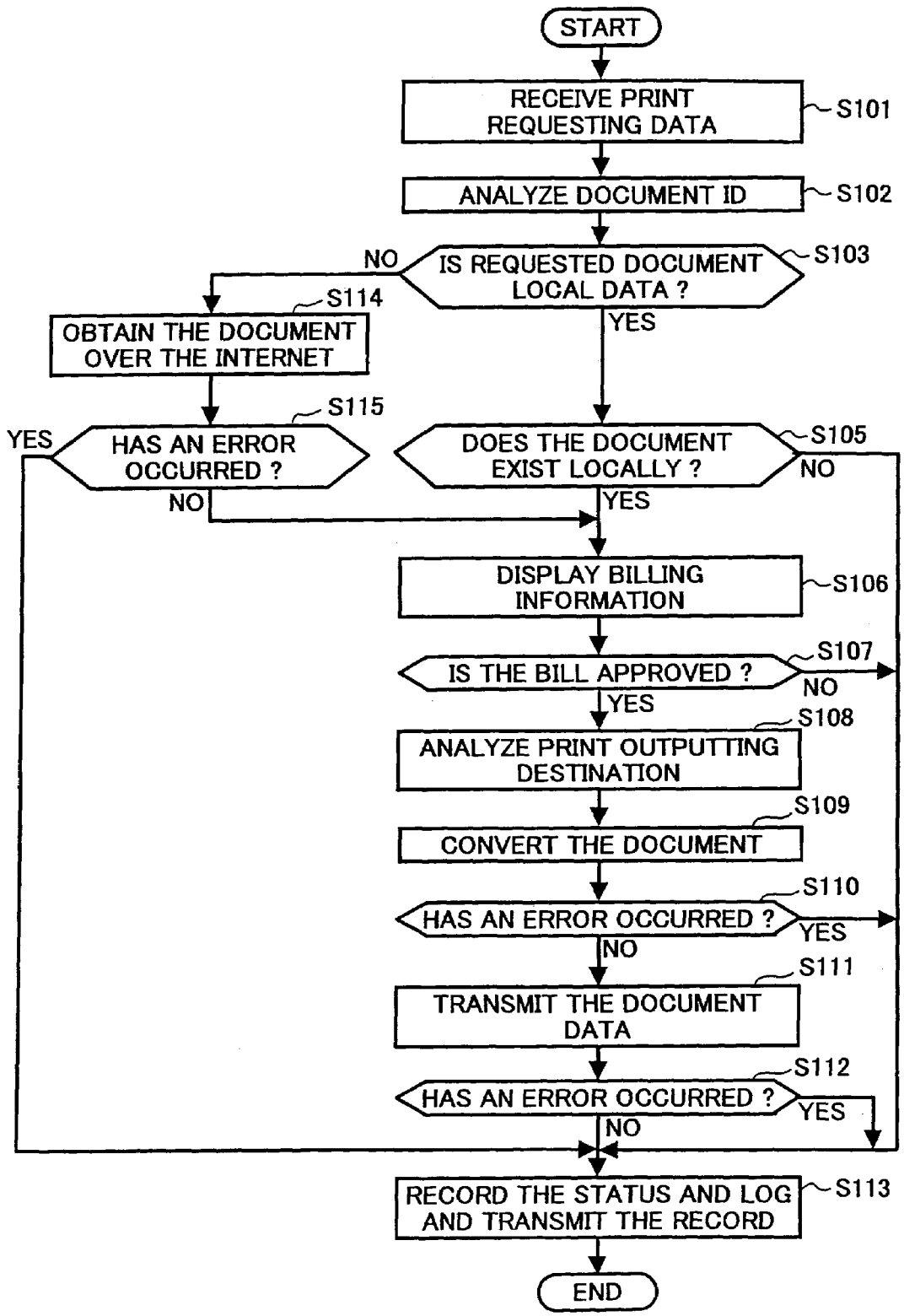
FIG. 5 is a diagram illustrating an exemplary process of a control part of the facsimile server.

FIG. 5 is a diagram illustrating an exemplary process of the control part 1072 of the facsimile server 107.

When the facsimile server 107 receives from the printing request administration server 105 via the Internet 106 print requesting data from the terminal 101 (step S101), the control part 1072 of the facsimile server 107 analyzes a document ID included in the print requesting data (step S1102).

Then, the control part 1072 determines whether requested document specified by the document ID is local data (step S103). For example, if the requested document starts with "file:/", the control part 1072 obtains the document from the data storage part 1075 of the facsimile server 107. If the document exists in the data storage part 1075 of the facsimile server 107 (Yes in step S105), the control part 1072 displays billing information for the document on the terminal 101 (step S106), so that approval of the bill for the document is obtained (step S107). The billing information includes for example a usage fee for the copyright of the document and a communication fee according to the file size of the document.

When the bill is approved (Yes in step S107), the control part 1072 analyzes the print outputting destination ID in the print requesting data to obtain information on the outputting device specified by the print outputting destination ID, e.g., a facsimile apparatus, a printer, a display, etc. (step S108). Then, the document is converted at the data conversion part 1073 (step S109) so that the document can be outputted with the print outputting device at the print outputting destination. For example, when the print outputting destination ID indicates that the outputting device is a G3 facsimile apparatus, an obtained HTML file or image file is converted to a G3 facsimile format at the data conversion part 1073 (step S108). If no error occurs in the above conversion (No in step S110), the control part 1072 transmits the converted document data to the print outputting destination (step S111). If the transmission is completed without an error (No in step S112), the control part 1072 records the status of successful transmission and the transmission log, and transmits the record to the printing request administration server 105 (step S113). The printing request administration server 105 manages billing to each user based upon the received record on successful or unsuccessful transmission.

If the requested document is not local data (No in step S103), the control part 1072 obtains the requested document over the Internet (step S114). For example, when the document ID includes a URL and starts with "http://", the control part 1072 obtains the document from a location on the Internet indicated by the URL. If the requested document is obtained over the Internet without an error (No in step S115), the processes in the steps S106-S113 are performed.

If the requested document does not exist in the data storage part 1075 of the facsimile server 107 (No in step S105) even when the requested document is local data, if an error has occurred in the conversion of the document in the step S108 (Yes in step S109), or if the requested document is not local data (No in step S103) and cannot be obtained over the Internet (Yes in step S115), the control part 1072 records the status of unsuccessful transmission and the transmission log, and transmits the record to the printing request administration server 105 (step S113).

If the bill is not approved by the user (No in step S107), the control part 1072 records that in the transmission log and transmits the record to the printing request administration server 105 (step S113).

Figure 6:
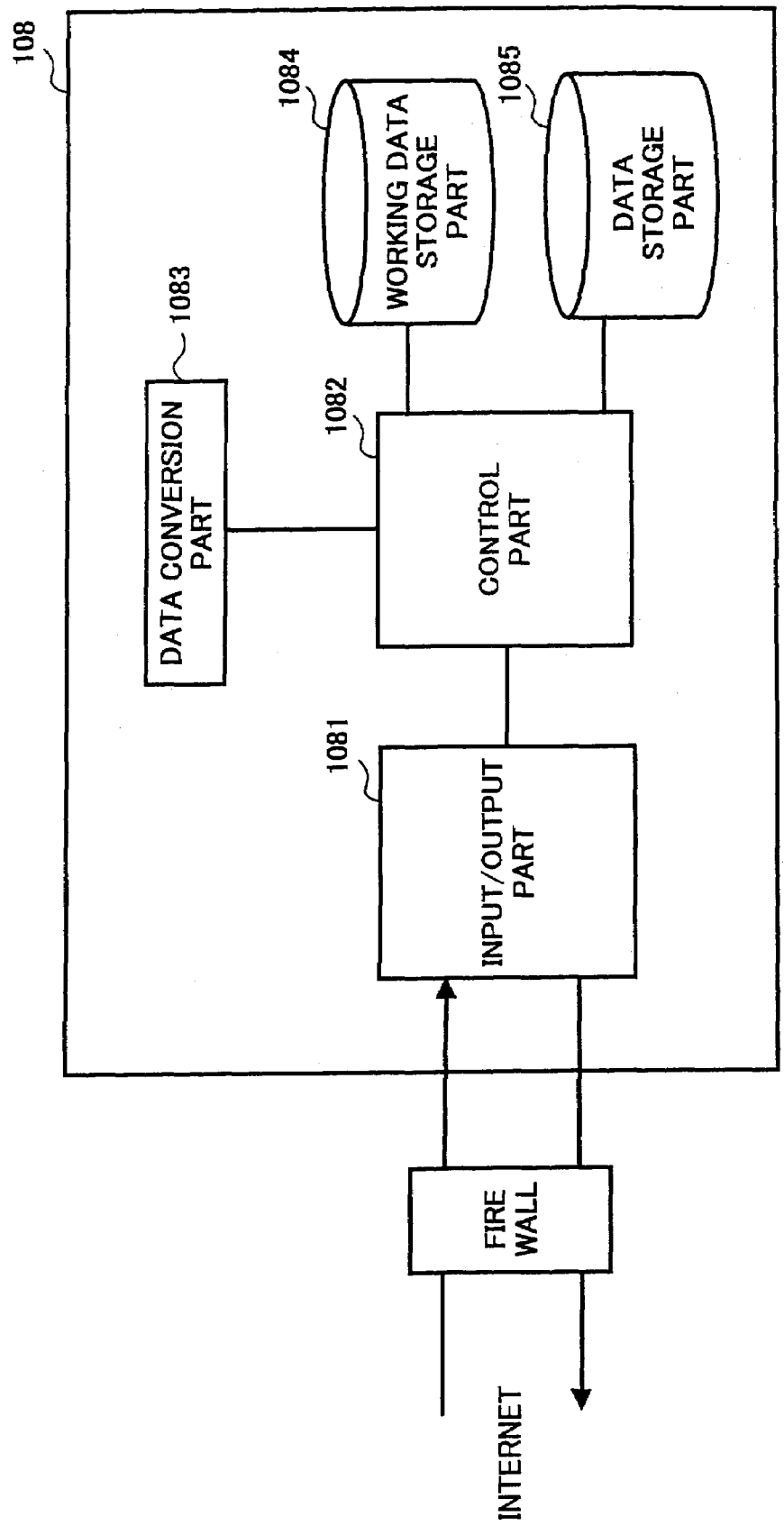
FIG. 6 is a diagram illustrating an exemplary configuration of a printer server of the information input/output system.

FIG. 6 is a diagram illustrating an exemplary configuration of the printer server 108 according to a preferred embodiment of the present invention. The printer server 108 includes an input/output part 1081 to input and output a document from and to the Internet 106, a data conversion part 1083, a working data storage part 1084, a data storage part 1085, and a control part 1082. Because configuration of the printer server 108 is substantially the same as that of the facsimile server 107 (FIG. 4) and the operation of the control part 1082 is also substantially the same as that of the control part 1072 of the facsimile server 107 (FIG. 5), the explanation thereof is omitted. The printer server 108 to be used is selected according to the domain name and the IP address of a printer at the print outputting destination as described above.

As described above, the printer server 108' is located in a LAN which is protected by a firewall, and therefore, the printer server 108 receives a printing request from the printing request administration server 105 with a protocol which can pass the firewall (e.g., electronic mail or HTTP, etc). Similarly, when transmitting a record of transmission status and transmission log, etc. to the printing request administration server 105, the printer server 108 transmits the record using such a protocol.

FIG. 7 through FIG. 23 are diagrams explaining the user interface displayed on a display of the terminal 101.

Figure 7:
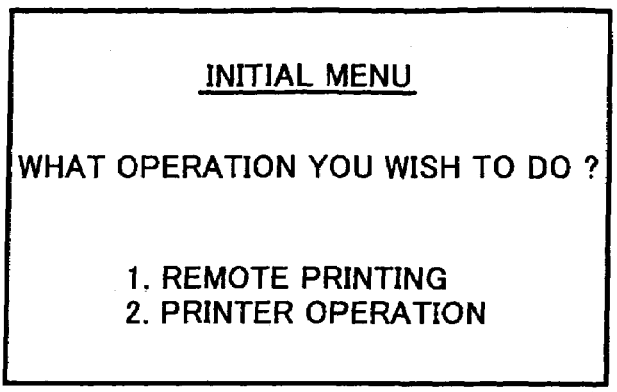
FIG. 7 is a diagram illustrating an example of an initial selection screen displayed on a display of a terminal of the information input/output system.

FIG. 7 illustrates an example of the initial selection screen displayed on the display of the terminal 101. In this example, the screen displays a menu listing "1. Remote Printing" and "2. Printer Operation", and a message asking which operation does the user wish to do. The "printer operation" includes various operations relating to an attribute of the user of facsimile apparatuses and printers, such as, editing of the list of facsimile apparatuses and printers frequently used, editing of bookmarks frequently printed, and changing of a facsimile cover page format in which a destination address are described.

Figure 8:
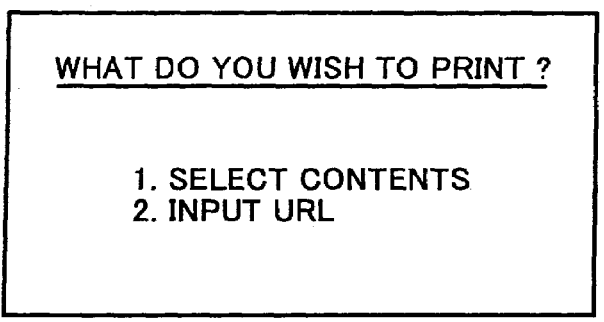
FIG. 8 is a diagram illustrating an example of a printing contents selection screen for asking the user to select printing contents.

FIG. 8 illustrates an example of the printing contents selection screen asking what does the user wish to print. In this example, the screen displays a menu listing "1. Select Contents" and "2. Input URL".

Figure 9:
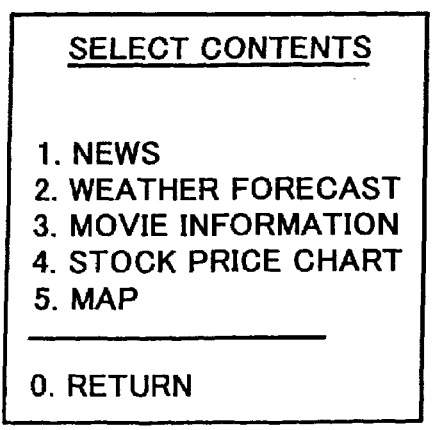
FIG. 9 is a diagram illustrating an example of a contents selection screen asking the user to select contents.

FIG. 9 illustrates an example of the contents selection screen asking the user to select the contents for printing. In the example, the screen displays a menu listing "1. News", "2. Weather Forecast", "3. Movie Information", "4. Stock Price Chart", and "5. Map".

Figure 10:
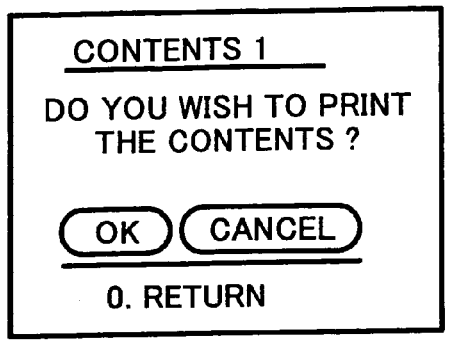
FIG. 10 is a diagram illustrating an example of a contents printing request confirmation screen for confirming if the contents should be printed.

FIG. 10 illustrates an example of the contents printing request confirmation screen for confirming if the contents should be printed. The screen displays the "OK" button for confirming printing of the contents selected on the contents selection screen of FIG. 9 and the "Cancel" button for canceling printing of the selected contents.

Figure 11:
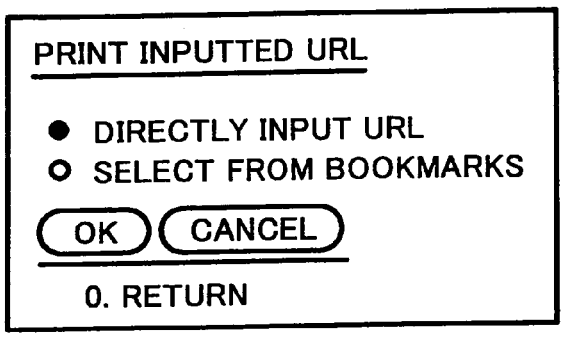
FIG. 11 is a diagram illustrating an example of a URL inputting method selection screen, which is displayed when "input URL" is selected on the printing contents selection screen of FIG. 8.

FIG. 11 illustrates an example of the URL inputting method selection screen, which is displayed when "Input URL" is selected on the printing contents selection screen of FIG. 8. The screen displays a menu listing "Directly Input URL" and "Select from Bookmarks". Also, the "OK" and "Cancel" buttons are displayed for confirming and canceling the selection.

Figure 12:
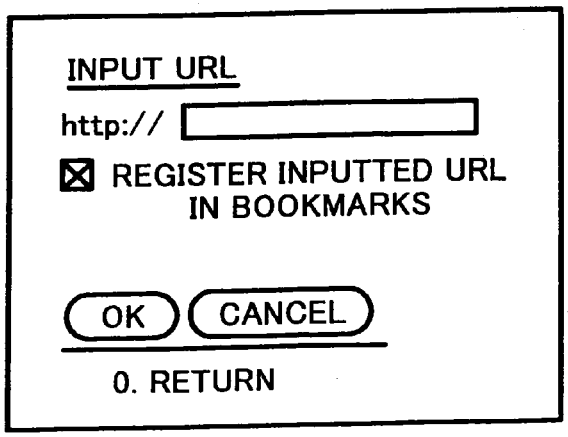
FIG. 12 is a diagram illustrating an example of a screen for directly inputting a URL, which is displayed when "directly input URL" is selected in the URL inputting method selection screen of FIG. 11.

FIG. 12 illustrates an example of the screen for directing inputting a URL, which is displayed when "Directly Input URL" is selected in the URL inputting method selection screen of FIG. 11. In this example, a message saying that "Register Inputted URL in Bookmarks" is also displayed for registering the inputted URL in the bookmarks of the user. Further, the "OK" button for continuing the printing operation of printing the inputted URL and the "Cancel" button for canceling the printing operation are displayed. If the "OK" button is selected, when the "Register Inputted URL in Bookmarks" is checked, the inputted URL is registered in the bookmarks of the user. If the "Register Inputted URL in Bookmarks" is not checked, the inputted URL is not registered in the bookmarks of the user.

Figure 13:
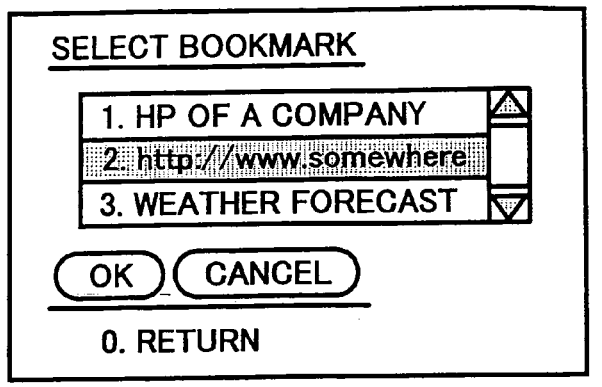
FIG. 13 is a diagram illustrating an example of a URL selection screen which is displayed when "select from bookmarks" is selected on the URL inputting method selection screen of FIG. 11.

FIG. 13 illustrates an example of the URL selection screen which is displayed when "Select from Bookmarks" is selected on the URL inputting method selection screen of FIG. 11. A plurality of URLs are displayed so that the user can select among therefrom. The display of a selected URL is reversed so as to be highlighted. Also, the "OK" button for confirming the selection of the URL and for continuing the printing operation and the "Cancel" button for canceling the selected URL are displayed.

Figure 14:
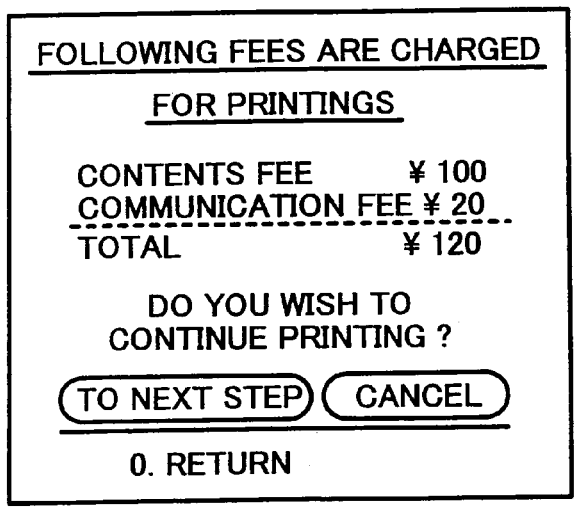
FIG. 14 is a diagram illustrating an example of a billing information screen for displaying billing information for printing selected contents (document)

FIG. 14 illustrates an example of the billing information screen for displaying a bill that is charged for printing selected contents (e.g., a document). In this example, the screen displays that the bill for the copyright of selected contents is 100 yen and the communication fee for printing the contents is 20 yen, and that in total 120 yen is charged to the user. The amount of the bill and the kind of the bill are dependent on the selected contents. Also, the "To Next Step" button for approving the bill and continuing the printing operation and the "Cancel" button for disapproving the bill and canceling the printing operation are displayed.

Figure 15:
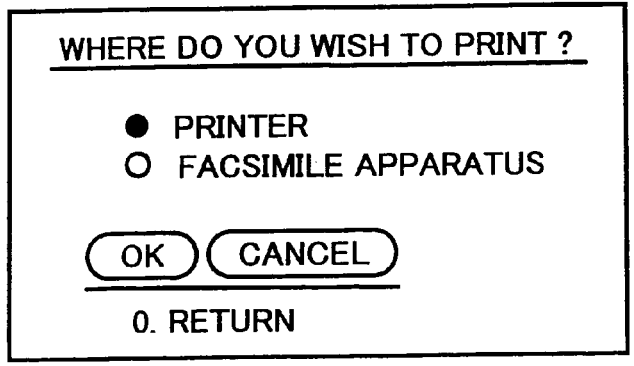
FIG. 15 is a diagram illustrating an example of an outputting destination device selection screen for selecting an outputting destination device to output selected contents.

FIG. 15 illustrates an example of the outputting destination device selection screen for selecting an outputting destination device to output selected contents. In the example, "rinter" and "Facsimile Apparatus" are displayed as the candidates for the outputting destination device. The "OK" button for confirming the selected outputting destination device and the "Cancel" button for canceling the selection are also displayed.

Besides "Printer" and "Facsimile Apparatus", "Display" can be added as the candidate for the outputting destination device. In this case, the URL of desired contents on the Internet can be transmitted to a PC connected with a data projector, so that the contents of the URL are inputted to the PC and displayed by the data projector connected with the PC.

FIG. 16 illustrates an example of the screen for selecting a printing time designation method. In the example, the screen displays a menu listing "Immediately", "at Designated Time", and "after Specified Time", so that the user selects among therefrom. Also, the "OK" button for proceeding to the subsequent operation according to the selection and the "Cancel" button for canceling the selection are displayed.

FIG. 17 illustrates an example of the screen for designating a printing time, which is displayed when "at Designated Time" is selected on the printing time designation method selection screen of FIG. 16. As illustrated, the fields for inputting month, day, hour and minute are displayed. The "OK" button for confirming the inputted data and the "Cancel" button for canceling the inputted data are also displayed.

FIG. 18 illustrates an example of the printing time designation screen, which is displayed when "after Specified Time" is selected on the printing time designation method selection screen of FIG. 16. The fields for inputting hour and minute for specifying how many hours and how many minutes later the contents should be printed are displayed. The "OK" button for confirming the inputted data and the "cancel" button for canceling the inputted data are also displayed.

Figure 19:
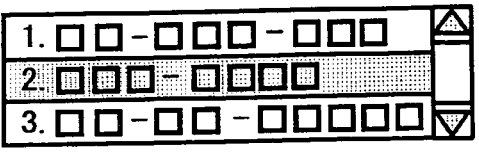
FIG. 19 is a diagram illustrating an example of a screen for selecting a method of inputting a facsimile number, which is displayed when "facsimile apparatus" is selected on the outputting destination device selection screen of FIG. 15.

FIG. 19 illustrates an example of the screen for selecting a method of inputting a facsimile number, which is displayed when "Facsimile Apparatus" is selected on the outputting destination device selection screen of FIG. 15. In the example, the screen displays "Direct Input" and "Select from List" as the candidates for the selection method. Also, the "OK" button for confirming the selection and the "Cancel" button for canceling the selection are displayed.

Figure 20:
FIG. 20 is a diagram illustrating an example of a screen for directly inputting a facsimile number, which is displayed when "direct input" is selected on the facsimile number inputting method selection screen of FIG. 19.

FIG. 20 illustrates an example of the screen for directly inputting a facsimile number, which is displayed when "Direct Input" is selected on the facsimile number inputting method selection screen of FIG. 19. In the example, a menu for registering the directly inputted facsimile number in a list is also displayed.

Figure 21:
FIG. 21 is a diagram illustrating an example of a screen for selecting a facsimile number, which is displayed when "select from list" is selected on the facsimile number inputting method selection screen of FIG. 19.

FIG. 21 illustrates an example of the screen for selecting a facsimile number, which is displayed when "Select from List" is selected on the facsimile number inputting method selection screen of FIG. 19. A plurality of candidate facsimile numbers are displayed in a list. In FIGS. 20 and 21, the "transmit" button for transmitting selected contents to the directly inputted or selected facsimile number and the "Cancel" button for canceling transmission of selected contents to the directly inputted or selected facsimile number are also displayed.

In FIGS. 7-21, a menu for returning to the previous screen, "0. Return", is also displayed. Further, the order of selection candidates in the menus in each of FIGS. 7-21 is not limited to the one illustrated in each figure or described above. For example, in FIG. 7, the order of "1. Remote Printing" and "2. Printer Operation" can be reversed. In FIG. 8, the order of "1. Select Contents" and "2. Input URL" can be reversed. In FIG. 9, the candidates for printing contents can be arranged in any other different orders. In FIG. 15, the order of outputting destination devices can be reversed. In FIGS. 16-18, the candidate methods for designating a printing time can be arranged in any other different order, and in FIG. 19, the candidate methods for inputting a facsimile number can be reversed.

Further, in FIG. 20 and FIG. 21, the "OK" button may be added for displaying a location of selected contents and billing information for the contents so that the user can confirm them before transmitting the contents to an inputted or selected facsimile number by selection of the "Transmit" button.

The above description has been made with respect to the example in which a facsimile apparatus is selected for the printing destination device. However, even when a printer is selected for the printing destination device, the terminal 101 can transmit selected contents or documents to the printer in a similar manner. For example, when a printer is selected, the screen of FIG. 20 is such that an IP address of the printer is inputted instead of a facsimile number, and in FIG. 21, IP addresses are displayed instead of facsimile numbers.

Figure 22:
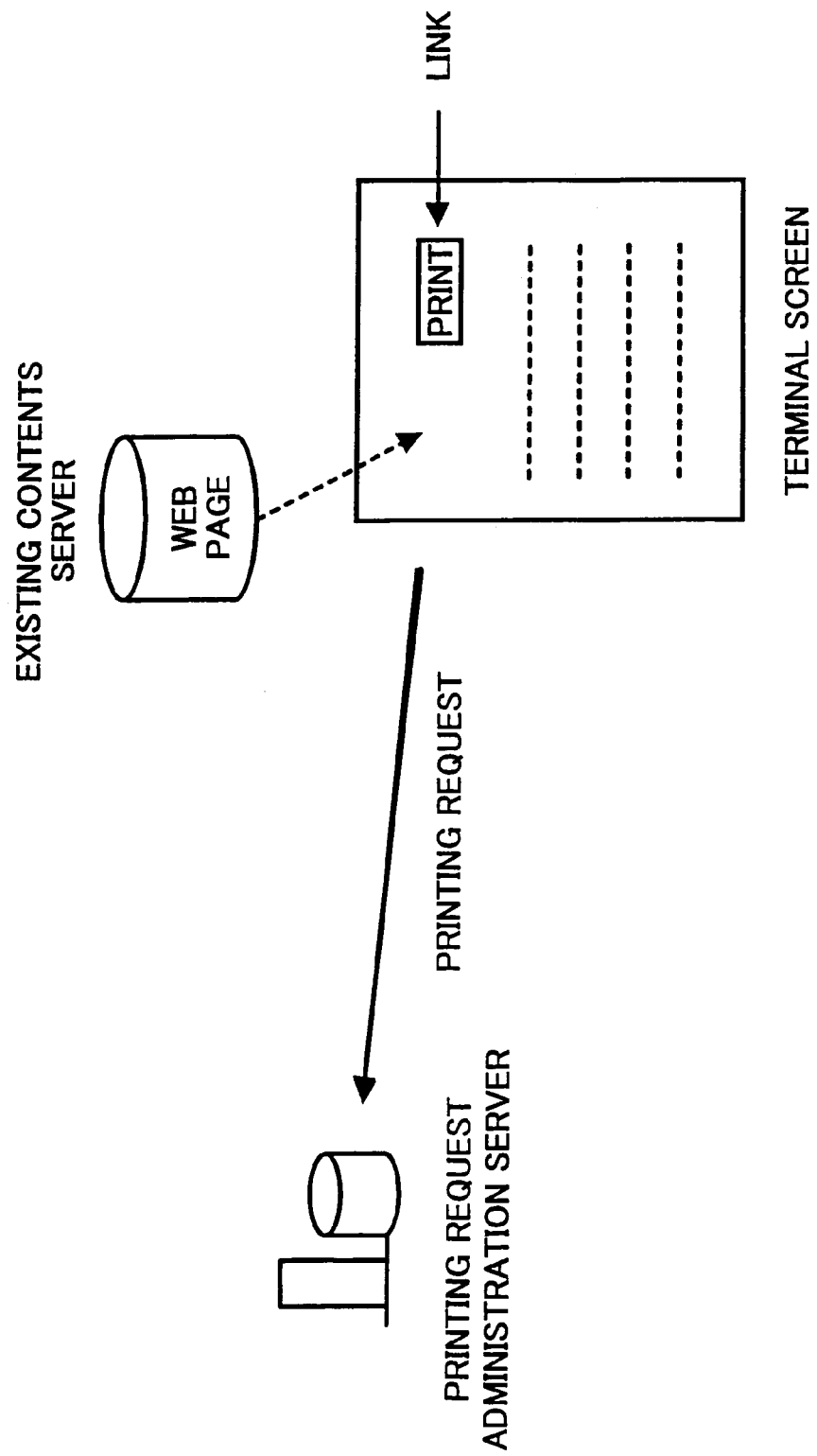
FIG. 22 is a diagram illustrating an example of a screen in which a printing button is displayed as a link for printing so that inputting of a document ID is simplified.

FIG. 22 illustrates an example in which a printing button is displayed on a display screen of the terminal 101, according to a preferred embodiment of the present invention, so that inputting of "Document ID" is simplified. In this example, a web page described with the HTML, etc. exists on an existing contents server, and the user accesses the web page with the terminal 101. The printing request administration server has a Command Gateway Interface (CGI) program for inputting print requesting data.

The web page includes, for example, the following link (anchor) embedded therein: <A REF="http://preqserver/cginame?docname=http://contserver/doc.html">print</A>. Here, "preqserver" represents the name of a printing request administration server, "cginame" represents the name of the CGI program for inputting print requesting data, which is included in the printing request administration server "preqserver", "contserver" represents the name of a contents server, and "doc.html" represents the name of a web page on the contents server "contserver".

The embedded link is displayed as a "Print" button on a display screen of the terminal 101 as illustrated in FIG. 22. If the user selects the "Print" button, the CGI program "cginame" of the printing request administration server "preqserver" is activated with the "http://contserver/doc.html", which is the URL of "doc.html", set at the parameter "docname". Accordingly, the CGI program "cginame" recognizes "http://contserver/doc.html" as the document ID of the printing request data.

Thus, for example, by setting the URL of a web page being displayed on the screen of the terminal 101 at the parameter "docname", the web page being accessed on the screen can be printed without designation of the URL. It is needless to say that another URL different from the one being accessed on the screen can be set at the parameter "docname". For example, by preparing a document dedicated for use in printing, which has substantially the same contents as the web page being accessed but has a different appearance design, and by setting the URL of the document dedicated for use in printing as the parameter "docname", it is possible to switch between the document for use in displaying and the document for use in printing. Thus, the operation of inputting a URL is eliminated, and thereby the operation of the user is simplified.

The subsequent operations are substantially the same as those illustrated in FIG. 14 and thereafter, and therefore, the description thereof is ormitted.

In the above-described example, the character corresponding to "Print" is used for the "print" button. Instead of the character, an image can be used as a printing icon. Also, in the above-described example, the CGI program is activated using a link. However, the CGI program can be activated using a form (<FORM>).

Figure 23:
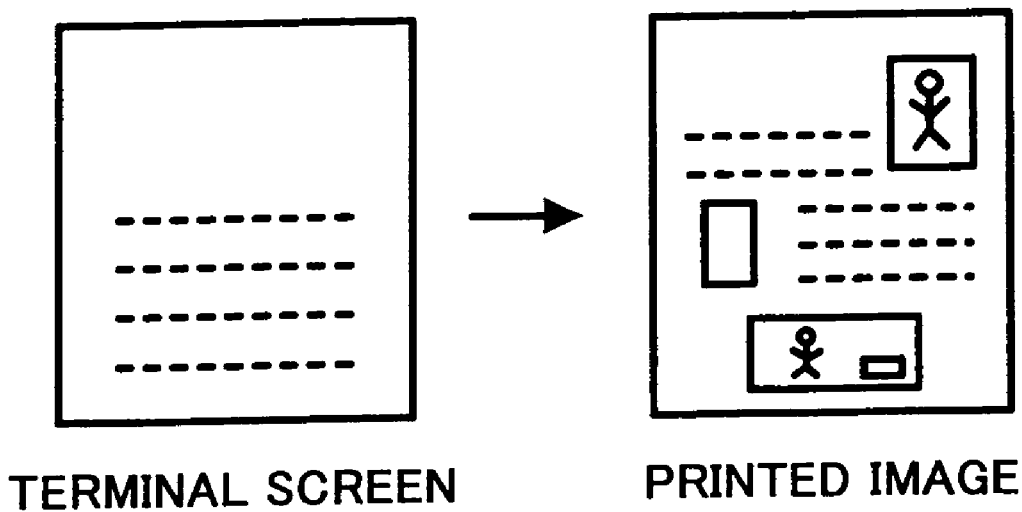
FIG. 23 is a diagram for explaining an example of using data of contents, which has been optimized for outputting the contents with an outputting destination device, instead of data of the contents for use in displaying the contents, when outputting the contents with the outputting destination device.

FIG. 23 is a diagram for explaining an example of using data of contents, which has been optimized for outputting the contents with an outputting destination device, instead of data of the contents for use in displaying the contents, when outputting the contents with the outputting destination device. The left part of FIG. 23 illustrates a state of a display screen of the terminal 101 when a user accesses a web page on a contents server using the terminal 101. Generally, mobile communication terminals have difficulty in displaying a web page having a large data size due to limitation in the performance of a CPU and the capacity of a memory of the terminals. Therefore, the web page expected to be displayed on a screen of such mobile communication terminals must be composed using mainly characters. On the other hand, outputting devices, e.g., printers, do not have such a limitation in the performance of a CPU and the capacity of a memory, and therefore, in many cases, web pages for use in printing do not have such a limitation to be composed using mainly characters.

Accordingly, a tag for notifying the facsimile server 108 or the printer server 107 of a document ID of a web page, which is prepared exclusively for use in printing, is defined. The tag is described, for example, in the header part of the web page. The tag may be defined, for example, as follows:

<MTEA type="g3fax" url=http://contserver/printable.g3>.

Here, "type" represents a parameter name expressing the kind of an outputting destination device, "g3fax" represents an identifier indicating that the outputting destination device is a G3 facsimile apparatus, "url" represents a parameter name expressing a URL, "contserver" represents the name of a contents server in which a corresponding document exists, and "printable.g3" represents a document name. In this example, data prepared exclusively for use in printing with a G3 facsimile apparatus exists and the URL of the data for use in printing is "http://contserver/printable.g3".

Similarly, when the outputting destination device is a printer, the tag can be defined as follows:

<META type="psprinter" url=http://contserver/printable.ps>.

The tag for other outputting apparatuses, e.g., display devices, can be defined in a similar manner. Further, a plurality of tags can be provided and described in the web page. Furthermore, it is needless to say that the above definitions of the tag are just examples, and the tag can be expressed in any manner so long as outputting servers such as the facsimile server 107 and printer server 108 can understand the tag.

The facsimile server 107 or the printer server 108, which has received print requesting data from the printing request administration server 105, obtains a document indicated by a document ID in the print requesting data on a local server, e.g., the facsimile server 107 or the printer server 108, or over the Internet, and then analyzes the obtained document data to retrieve the above <META> tag. If the corresponding <META> tag is found, the facsimile server 107 or the printer server 108 performs subsequent processes using a document ID designated by the <META> tag instead of the document ID designated by the print requesting data. Thereby, the web page, which is composed using mainly characters so as to be displayed in a terminal, as illustrated in the left part side part of FIG. 23, can be switched to a corresponding web page prepared for use in printing, which includes images as illustrated in the right part of FIG. 23, or to video image data prepared for use in displaying the web page with a display device.

If it is predetermined such that a <META> tag is described in the header of a document, when the facsimile server 107 or the printer server 108 obtains a document specified by a document ID in a print requesting data on a local server or over the Internet, it is not necessary to obtain the whole part of the document, and the <META> tag can be retrieved by only obtaining the header part of the document.

Further, the information input/output system can be configured such that retrieval of a <META> tag is performed at the terminal 101 requesting printing of a document and a document ID of a document for use in printing is included in print requesting data to be transmitted to the facsimile server 108 or the printer server 107.

In the above-described information input/output system, some of the outputting apparatuses (e.g., the facsimile apparatus 110 and the printer 112) may be configured to output contents only onto a sheet of a specific size, e.g., an A4 size sheet, or to output or print only a specific file. When outputting of information contents is requested specifying a sheet size or a file that cannot be outputted with a designated outputting apparatus, an operational error or outputting error is caused in the designated outputting apparatus.

Accordingly, as described above, the printer server 108 and the facsimile server 107 have the function of converting obtained document data such that the document can be outputted with an outputting device at the print outputting destination. Specifically, the facsimile server 107 and the printer server 107 have a contents conversion function to edit contents and to convert the printing form and the file format of the contents to those adapted to a designated outputting destination device such as a facsimile apparatus and a printer. For example, if the facsimile apparatus or the printer as the outputting destination device can output information contents only in an A4 size, or can output only in a specific file format, the printer server 108 or the facsimile server 107 edits the contents so as to be printed in an A4 size sheet, or converts the file format to the one which can be outputted with the destination facsimile apparatus or printer.

Information as to the performance and characteristics of a destination facsimile apparatus or printer, based on which how information contents for printing should be edited is determined, is stored in advance in the printer server 108 or the facsimile server 107. The information may be stored in the printer server 108 or the facsimile server 107 in any manner. For example, information as to outputting apparatuses used by a user (e.g., facsimile apparatuses or printers) may be stored in advance so as to correspond to respective print outputting destination IDs of the user, which are illustrated in FIG. 3. The necessary information may be stored as required when the print server 108 or the facsimile server 107 is connected with each outputting apparatus, or when a printing operation is successfully completed with the outputting apparatus for the last time. Thereby, each of the outputting apparatuses used by the user is not required to have outputting software, (e.g., driver software) for outputting each contents, and the user can easily obtain and output desired information contents without worrying about the performance and capability of the outputting apparatuses used by the user.

In services provided to portable information terminals connected to the Internet, generally, desired information contents can be accessed via a menu of multi-level layers. The information contents are generally diverse, and the number of the contents is huge. When the desired contents are difficult for a user to understand or to read on the display of a terminal, which is relatively small, the user generally desires to print out the contents. In this case, the user may desire to print the information contents selected on the display screen of the terminal. However, the system has not been available which allows a user to issue a printing instruction after displaying desired information contents on a display screen of a terminal or after selecting desired information contents in the menu displayed on the display screen.

In the above-described information input/output system, when printing desired information contents with an outputting apparatus, print requesting data including the contents ID of the desired information contents is transmitted to the printing request administration server 105, and is then transmitted to one of the facsimile servers 107 or the printer servers 108 determined according to the print outputting destination ID. In this case, after accessing the desired information contents for printing with the terminal 101, for inputting the contents ID with the terminal 101, the user must make a note of the contents ID of the desired information contents. For simplifying the above operation of inputting the contents ID with the terminal 101, as described above, the "Print" button functioning as a link or a form can be provided at a part of the contents being displayed on the display of the terminal 101. In this case, however, data of each contents must be changed such that the "Print" button is displayed within the contents being displayed on the display screen of the terminal 101. Because the number of contents is huge, changing of data of each contents is troublesome and time consuming.

Accordingly, a terminal according to a preferred embodiment of the present invention is provided with a printing button, which is separate from a "Print" button displayed within the information contents being displayed on a display of the terminal.

Figure 24A:
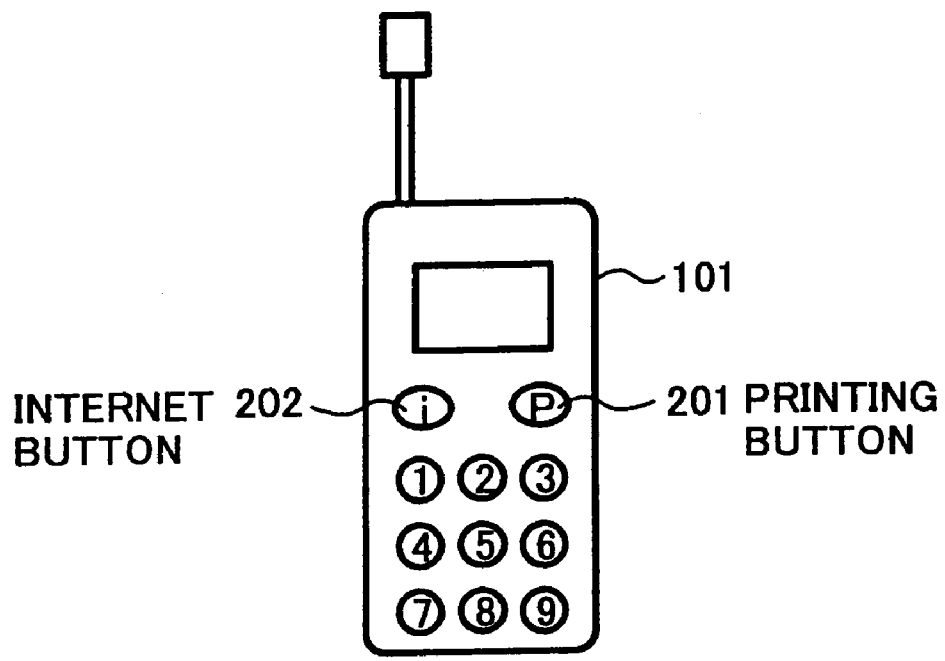
FIG. 24A and FIG. 24B are diagrams illustrating examples of a terminal in which a printing button is provided besides regularly provided buttons.
Figure 24B:
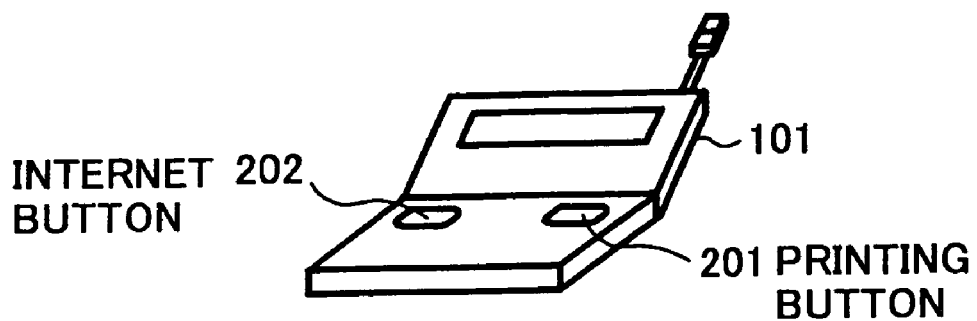

FIG. 24A and FIG. 24B illustrate examples of the terminal in which the above-described printing button is provided. FIG. 24A illustrates an example of the portable terminal 101, in which a printing button 201 is provided besides regularly provided buttons. An Internet button 202 for connecting with the Internet is also provided in the terminal 101. FIG. 24B illustrates another example of the portable terminal 101, in which the printing button 201 is provided at a part of the keyboard of the terminal 101. The Internet button 202 for connecting with the Internet is also provided in the terminal 101 of FIG. 24B.

In the examples of FIGS. 24A and 24B, the printing button 201 is a hardware button such as a mechanical or electrical switch, provided at a part of the terminal 101. Alternatively, the printing button 201 may be a button that is always displayed at a predetermined position on the display screen, or a button that is pulled down as necessary, by software embedded in the terminal 101.

The printing button 201 may have substantially the same function as described with respect to the "print" button illustrated in FIG. 22. Specifically, when the "Print" button 201 is depressed, data stored in the terminal 101, such as the location (e.g., URL) of the printing request administration server 105, which is the destination of a contents ID, and the print outputting destination ID frequently used by the user, is automatically transmitted to the printing request administration server 105.

Suppose that the terminal 101 stores the facsimile number, "012-3456-7890", which is frequently used by a user, as the print outputting destination ID. Further, suppose that the contents having the contents ID, "http://contserver/doc.html", is displayed on the display of the terminal 101. The function similar to the following URI (Uniform Resource Information) is assigned to the printing button 201 of the terminal 101; "http://preqserver/cginame?docname=http://contserver/doc.html&faxnumber=012-3456-7890". Here, "preqserver" represents the name of a printing request administration server, and "cginame" represents the name of a "cgi" for use in data inputting, operating in the printing request administration server. As parameters, "docname" and "faxnumber" are inputted. In this example, when the printing button 201 is depressed, the contents ID and the print outputting destination ID, which are displayed on the display screen of the terminal 101, are transmitted to the printing request administration server 105 at the same time. The data to be transmitted to the printing request administration server 105 can be of any type. Further, the name of the printing request administration server stored in the terminal 101 can be changed. Furthermore, instead of transmitting a print outputting destination ID, the print outputting destination ID can be designated, after the terminal 101 is connected with the printing request administration server 105.

With the above-described configuration, by simply depressing the printing button 201, existing contents can be easily printed, without requiring inputting of a contents ID, or changing contents data such that the "print" button is displayed within the displayed contents.

Further, data which is transmitted to the printing request administration server 105 when the printing button 201 is depressed, i.e., the contents ID and the print outputting destination ID in the above example, can be displayed on the display of the terminal 101 so as to be confirmed by the user. Further, the user can change displayed data after confirming the data on the display screen if necessary.

Thus, by allowing a user to confirm data stored in the terminal 01 before transmitting the data to the printing request administration server 105, the user is provided with the opportunity to change only the data which is necessary, while avoiding the labor of inputting the data. Thereby, the operation of the terminal 101 is enhanced and is simplified.

Generally, a portable information terminal can receive information of a relatively small size, which can be stored in the memory available in the terminal, such as image data of a relatively small size or text data of up to about 256 characters. When information is of a relatively large size, the part of the information exceeding the memory capacity of the terminal is deleted so as not to be received by the terminal. A method may be conceivable to attach a dedicated printer to the portable terminal, so that image information can be outputted with the attached printer while being received by the terminal. However, such a printer is relatively expensive, large and heavy, and is not suitable for being carried.

Accordingly, the above-described information input/output system may be configured, according to another preferred embodiment of the preset invention, such that information contents, which cannot be received by the terminal 101 due to the size of the contents, can be outputted with an arbitrary outputting apparatus (e.g., facsimile apparatus or printer), which is connected with the Internet directly or indirectly. A gateway, which is arranged between a transmitting apparatus and the receiving terminal 101 to relay data, stores contents data, which cannot be received by the terminal 101, on the Internet, instead of transmitting the data to the terminal 101, and then assigns a contents ID to the stored contents data. The order of storing the contents data and assigning the contents ID can be reversed. Thus, the terminal 101 can output data, which cannot be received by the terminal 101 and which is stored on the Internet, with an arbitrary outputting apparatus by transmitting the content ID and the print outputting destination ID of the data to the printing request administration server 105.

FIG. 25 is a diagram for explaining the information input/output system configured as described immediately above. In FIG. 25, a facsimile apparatus 110 transmits a facsimile image to a portable terminal 101'. If a facsimile apparatus is not connected with the terminal 101', the transmitted facsimile image cannot be received by the terminal 101'. Therefore, in such a case, the facsimile image is deleted immediately or after a predetermined period of time. According to the present invention, it is determined at the facsimile server 107, which functions as the above-described gateway, to relay data, that the facsimile image transmitted by the facsimile apparatus 110 cannot be received by the terminal 101'. The determination can be made in various manners.

For example, if the telephone number specified by the print outputting destination ID is one of cellular phones, or if an error has occurred after the facsimile apparatus 110 is connected with the terminal 101', it is determined as the facsimile image cannot be received by the terminal 101'.

The facsimile image which cannot be received by the terminal 101' is assigned with a contents ID, and at the same time is stored on the Internet. The facsimile image can be stored in any storage place on the Internet, that can be reached from the terminal 101'. For example, the storage place can be the facsimile server 107 or 107', other gateway, contents server, etc.

The user of the terminal 101' regularly or occasionally retrieves predetermined storage places to confirm if data that cannot be received by the terminal 101' is stored. If data which cannot be received by the terminal 101' is found, the contents ID and the print outputting destination ID of the data are transmitted to the printing request administration server 105, and thereby the data which cannot be received by the terminal 101' is outputted with an arbitrary printing apparatus. In the above example, the description has been made with respect to a case in which a facsimile image is transmitted to the terminal 101'. However, even when a long electronic mail, or an electronic mail attaching an image, etc. and thereby having a large volume is transmitted to the terminal 101', the electronic mail can be outputted with an arbitrary outputting apparatus in a similar manner.

Further, when the facsimile server 107 or 107' stores data, which cannot be received by the terminal 101', on the Internet, information indicating the storage place on the Internet, e.g., the contents ID assigned to the stored data, is notified to the terminal 101'. Thereby, time difference between transmission of the data and outputting of the data is minimized. The notice to the user of the terminal 101' of inability of receiving data may be made using an electronic mail.

By thus configuring the information input/output system as described above, data which cannot be received by the terminal 101', such as facsimile data or a long electronic mail, can be outputted with an arbitrary outputting apparatus designated by the user. Further, by notifying the user of the terminal 101' that the data is stored on the Internet, using an electronic mail, etc, information contents can be easily transmitted to the terminal 101' without worrying about the kind and the volume of the contents.

Next, an exemplary configuration of an information input/output system according to another preferred embodiment of the present invention is described, in which a user is billed in an appropriate and easy manner when the user has obtained contents.

According to the present invention, when a user accesses the printing request administration server 105, the printing request administration server 105 authenticates a user when the user accesses the printing request administration server 105 so that the user using the printing request administration server 105 is recognized. Further, the printing request administration server 105 has an information table for each user, which includes the following information:
1. user name;
2. password;
3. billing address;
4. personal information such as the electronic mail address;
5. other information.

The printing request administration server 105 has another information table for each print requesting data, which includes the following information:
1. user name;
2. print outputting destination ID;
3. contents ID;
4. communication time;
5. communication data size;
6. outputting state (successful or unsuccessful);
7. communication log (error information, etc.);
8. other information.

The printing request administration server 105 compiles or edits the above tables regularly, for example on a predetermined day of each month, to calculate the billing amount for each user. Further, the printing request administration server 105 notifies each contents provider having the copyright of contents which has been printed in the system or the system administrator of the system of the usage status of each user, so that each contents provider or the system administrator can bill each user for the usage of the copyright or the usage of the system.

The bill to each user may include, for example, the fee for maintaining the user ID for being provided with a printing service of the system (e.g., \100 per month), the outputting fee (e.g., fee according to the number of prints), and the information contents fee for fee-charging contents which has been printed.

The printing request administration server 105 may be configured to generate a detailed statement of the bill for the contents fee using the above information to be sent to each user by mail. The statement may be transmitted to each user via facsimile transmission using the system. When facsimile transmission is used, transmission confirmation is available, which is high in utility value to the user.

As described above, when information contents are obtained and outputted with an outputting apparatus using a terminal via a network, an appropriate billing system for billing the user of the terminal for the obtained information contents is required. A copying machine installed for example at a convenience store is generally provided with a fee collecting device, so that each time prints are made with the copying machine, the fee for the prints is paid. Furthermore, a system for remotely diagnosing copying machines in the field has been proposed recently, and some of the copying machines in the convenience stores are provided with the function of being remotely diagnosed. The fee collecting device provided to the copying machines installed at convenience stores generally uses a billing system in which the fee for prints changes according to the number of prints. Typically, the fee per print decreases as the number of prints increases. Therefore, when fee-charging information contents obtained using a terminal are printed with a copying machine provided with a fee collecting device having such a billing system and the outputting fee collected by the fee collecting device is to be distributed between the provider of the fee-charging information contents and the provider of the copying machine, appropriate distributing of the fee is troublesome.

Furthermore, in a method of accessing information contents and outputting the information contents with a facsimile apparatus using a cellular phone, which has been previously proposed by the present applicant, when outputting the contents, a user must access a print request administration server for designating a print outputting facsimile apparatus. In the above-described method of outputting information contents with a facsimile apparatus, the user generally operates his or her cellular phone to access desired information contents in front of the facsimile apparatus installed for example in a convenience store, with which the user desires to output the desired information contents. The user then accesses the print request administration server, and designates the facsimile apparatus in front of the user for the print outputting destination device, so that the desired information contents are printed by the facsimile apparatus. However, when the facsimile apparatus is installed in a building where radio communication is not possible, to access the desired information contents with the cellular phone, the user must move to a place where the radio communication is possible. Therefore, so that the user can designate the facsimile apparatus in front of the user for the print outputting destination device, the user must record the facsimile number of the facsimile apparatus before moving to the place where radio communication is possible, which is troublesome for the user.

Figure 26:
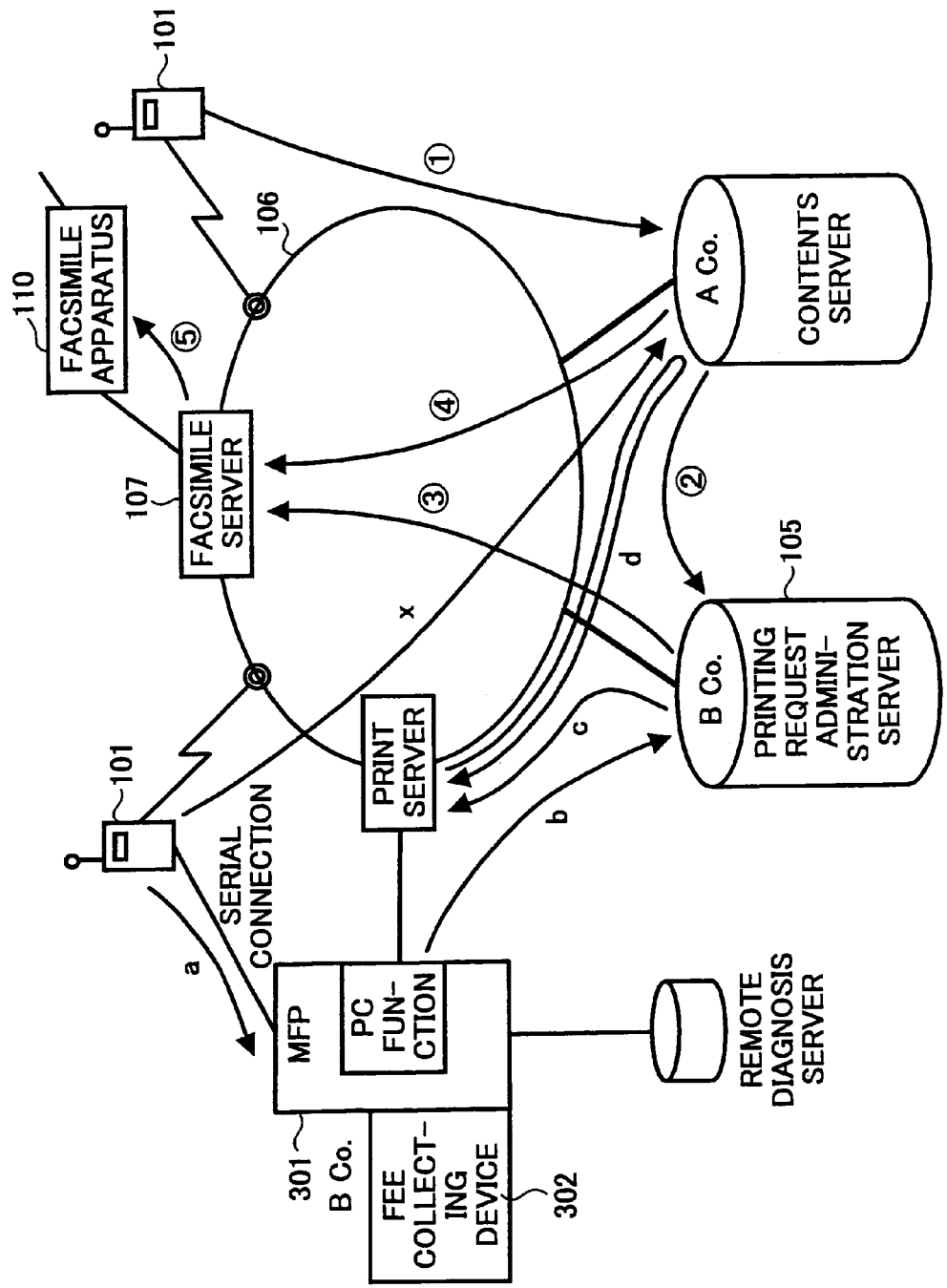
FIG. 26 is a diagram of an information input/output system according to another preferred embodiment of the present invention for explaining a method of billing a user for a usage fee for information contents.
Figure 27B:
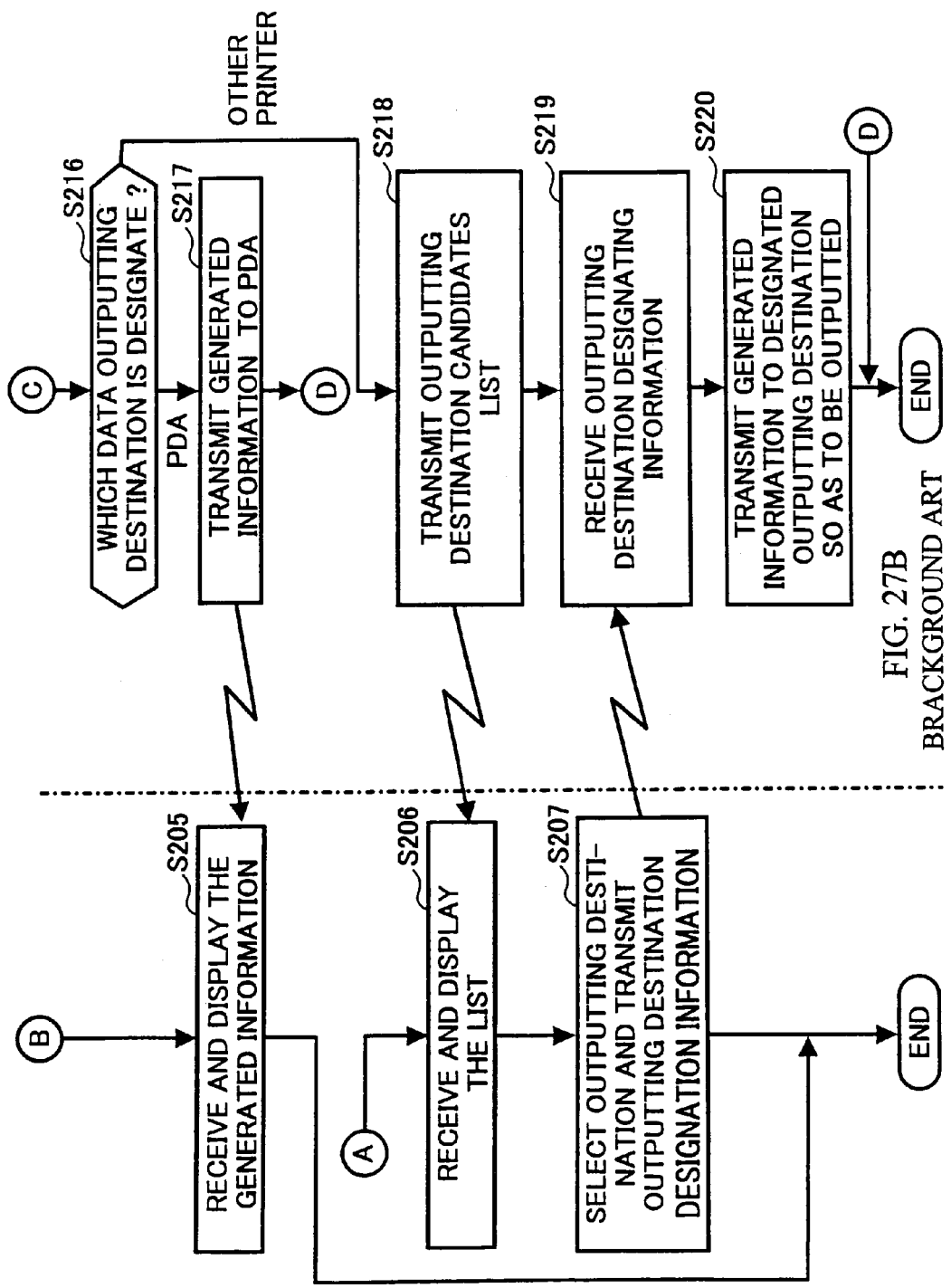

FIG. 26 is a diagram illustrating an information input/output system according to another preferred embodiment of the present invention, in which the above-described inconveniences have been avoided.

In FIG. 26, the terminal 101, which communicates with the Internet 106 via wireless communication, is connected, as indicated by the arrow "a", with a printing apparatus, such as a Multi-Function Product (MFP) 301 having functions of a printer, a facsimile apparatus and a copying machine, which are connected with the Internet 106 and installed at a convenience store, for example. The MFP 301 is provided with a fee collecting device 302. Further, the MFP 301 subscribes to a remote diagnosing service provided by a remote diagnosis server. The MFP 301 receives from the terminal 101 print requesting data including a contents ID indicating the location of desired information contents, (e.g., a URL), in a contents server connected with the Internet 106 and a print outputting destination ID specifying the MFP 301 for the print outputting destination device. The terminal 101 may be connected with the MFP 301 by any connecting method, for example, by serial connection using a wired communication standard such as RS232C or USB or a wireless communication standard such as Bluetooth, etc.

Then, the MFP 301 transmits, as indicated by the arrow "b", the print requesting data including the contents ID (URL) and the print outputting destination ID (MFP 301) to the printing request administration server 105 connected with the Internet 106. Thereafter, the printing request administration server 105 transmits, as indicated by the arrow "c", the print requesting data to a print server connected with the Internet 106. The print server accesses, as indicated by the arrow "d", contents data in a contents server based upon the contents ID in the print request data, converts the contents data to a format that can be outputted by the MFP 301, and outputs the converted data to the MFP 301. The above conversion of the contents data may be performed by the printing request administration server 105.

Thus, the desired contents is transmitted to the MFP 301, and the desired contents is outputted onto a sheet by the MFP 301. The arrows ①-⑤ indicate for reference the process of outputting desired contents to the facsimile apparatus 110. The arrow "x" indicates an auxiliary process of accessing the contents server to confirm the contents contained in the contents server. If the terminal 101 has the information as to the contents ID (URL) of desired contents, this process is not necessary.

Thus, by connecting a cellular phone with a MFP 301 connected with the Internet, a user can easily obtain information contents on the Internet with the cellular phone even when the user is located in a place where radio communication is not possible.

Further, when the MFP 301 outputs the contents, the outputting fee for the contents is collected by the fee collecting device 302 provided to the MFP 301, and the printing request administration server 105 is configured to store information of collecting the outputting fee with the fee collecting device 302. Thereby, the administrator of the printing request administration server 105 can determine based on the information the fee to be paid to the provider of the contents which has been printed, so that the fee for the contents can be paid to the provider of the contents before actually collecting the outputting fee collected by the fee collecting device 302.

Furthermore, because the MFP 301 has the function of being remotely diagnosed and subscribes to the remote diagnosis service, the fee for the contents and/or the fee for outputting the contents with the MFP 301 can be added to the fee for subscribing to the remote diagnosis service. Thereby, collection of the fee for the contents and/or the fee for outputting the contents with the MFP 301 can be greatly facilitated.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2000-264123 filed in the Japanese Patent Office on Aug. 31, 2000, and the entire contents of which are hereby incorporated herein by reference.

What is claimed as new and is desired to be secured by Letter Patent of the United States is:

1. An information input/output system, comprising:
    printer servers configured to connect with an Internet;
    facsimile servers configured to connect with the Internet;
    printers configured to connect with the printer servers;
    facsimile apparatuses configured to connect with the facsimile servers;
    terminals configured to connect with the Internet, to access information contents on the Internet, and to transmit printing request data including at least a contents ID specifying information contents for printing from among information contents on the Internet, and a print outputting destination ID specifying at least one of the printers and facsimile apparatuses for printing therewith specified information contents for printing; and
    a printing request administration server configured to connect with the Internet, to receive the printing request data transmitted from the terminals, and to transmit the printing request data to at least one of the printer and facsimile servers determined according to the print outputting destination ID,
    wherein the printing request administration server is configured to compile and edit, for each of the terminals, information as to the specified information contents for printing and at least one of the printers and facsimile apparatuses for printing therewith the specified information contents for printing, specified by the contents ID and the print outputting destination ID, respectively, received from the terminal and to notify at least one of a contents provider of the specified information contents for printing and a system administrator of the information input/output system of a result of compiling and editing the information.

2. The information input/output system according to claim 1, wherein at least one of the printers and facsimile apparatuses is configured to connect with each of the terminals so as to receive the printing request data including the contents ID and the print outputting destination ID transmitted, from the terminal and to transmit the printing request data to the printing request administration server, and when one of the terminals is connected with the at least one of the printers and facsimile apparatuses configured to connect with each of the terminals, the printing request administration server receives the printing request data from the at least one of the printers and facsimile apparatuses with which the one of the terminals is connected and transmits the printing request data to at least one of the printer and facsimile servers determined according to the print outputting destination ID.

3. The information input/output system according to claim 2, wherein at least one of the printers and facsimile apparatuses configured to connect with each of the terminals includes a fee collecting device configured to collect a fee for printing therewith the specified information contents for printing, and the printing request administration server stores information of collecting the fee with the fee collecting device.

4. An information input/outputting system, comprising:
a printer configured to connect with an Internet and to obtain information contents on the Internet;
a diagnosing system configured to connect with the Internet and to remotely diagnose the printer subscribing to the diagnosing system and to bill a fee for subscribing to the diagnosing system,
wherein when information contents on the Internet are obtained with the printer subscribing to the diagnosing system and obtained information contents are outputted with the printer, the diagnosing system is configured to add a fee for outputting the information contents with the printer to the fee for subscribing to the diagnosing system.

* * * * *